United States Patent
Domitrowski

(10) Patent No.: US 12,202,093 B2
(45) Date of Patent: Jan. 21, 2025

(54) CUTTING TOOL SHARPENING ANGLE AID APPARATUSES AND METHODS

(71) Applicant: Glenn Domitrowski, Hillsborough, NJ (US)

(72) Inventor: Glenn Domitrowski, Hillsborough, NJ (US)

( * ) Notice: Subject to any disclaimer, the term of this patent is extended or adjusted under 35 U.S.C. 154(b) by 429 days.

(21) Appl. No.: 17/833,944

(22) Filed: Jun. 7, 2022

(65) Prior Publication Data
US 2023/0390879 A1    Dec. 7, 2023

(51) Int. Cl.
*G01C 9/28*    (2006.01)
*B24B 3/54*    (2006.01)

(52) U.S. Cl.
CPC . *B24B 3/54* (2013.01); *G01C 9/28* (2013.01)

(58) Field of Classification Search
CPC .................................... B24B 3/54; G01C 9/28
USPC .................................................... 33/347, 379
See application file for complete search history.

(56) References Cited

U.S. PATENT DOCUMENTS

| | | | |
|---|---|---|---|
| 2,097,848 A * | 11/1937 | Torbert, Jr. | G01C 9/28 33/376 |
| 2,782,524 A * | 2/1957 | Vogt | G01C 9/36 33/379 |
| 3,009,250 A | 11/1961 | Schock | |
| 4,125,944 A | 11/1978 | Esposito et al. | |
| 4,343,093 A * | 8/1982 | Eadens | G01C 9/28 D10/69 |
| D280,380 S | 9/1985 | Graves | |
| 4,580,350 A * | 4/1986 | Fincher | G01C 9/28 33/372 |
| 4,733,501 A | 3/1988 | McLean | |
| 5,063,679 A | 11/1991 | Schwandt | |
| 5,472,375 A | 12/1995 | Pugh | |
| 6,332,277 B1 * | 12/2001 | Owoc | G01C 9/28 33/373 |
| 6,351,875 B1 * | 3/2002 | Wright | G01C 9/28 24/482 |

(Continued)

FOREIGN PATENT DOCUMENTS

CN    202210338176.2    8/2022

OTHER PUBLICATIONS

Publication: Knife Sharpening Angle Coach With Bluetooth & Arduino https://www.instructables.com/Bluetooth-Arduino-BNO055-Knife-Sharpening-Angle-Co/; Printed out Jun. 7, 2022.

(Continued)

*Primary Examiner* — George B Bennett
(74) *Attorney, Agent, or Firm* — Walter J. Tencza, Jr.

(57) ABSTRACT

A cutting tool sharpening angle aid including a spirit level vial; a first spirit level vial harness to which the spirit level vial is configured to be attached; a first member to which the spirit level harness is attached; a base which is attached to the first member; and a first attachment device which is configured to attach the base to a blade of a cutting tool. The first attachment device may be a magnet. The first attachment device may be an elastic band. In at least one embodiment, both a magnet and one or more elastic bands may be used for the first attachment device, and/or a first and a second attachment device may be provided. The first member may be triangular shaped. The base may be rotatably attached to the first member or fixed to the first member.

29 Claims, 37 Drawing Sheets

(56) References Cited

U.S. PATENT DOCUMENTS

| | | | | |
|---|---|---|---|---|
| 6,834,435 | B2* | 12/2004 | Turner | G01C 9/28 33/529 |
| 7,467,475 | B1* | 12/2008 | Cheek | G01C 9/24 33/DIG. 1 |
| 7,644,506 | B2* | 1/2010 | Wong | G01C 9/28 33/373 |
| 7,669,342 | B1* | 3/2010 | Crain | G01C 9/28 33/372 |
| 7,913,406 | B2* | 3/2011 | Norelli | G01C 9/28 33/DIG. 1 |
| 7,987,608 | B2 | 8/2011 | Rowe | |
| 9,182,227 | B1 | 11/2015 | Paesano | |
| 9,221,144 | B2 | 12/2015 | Powell | |
| 10,675,736 | B1 | 6/2020 | Boutorine | |
| 10,969,213 | B1* | 4/2021 | Silberberg | G01C 9/34 |
| 10,976,159 | B1* | 4/2021 | Silberberg | G01C 9/28 |
| D935,299 | S | 11/2021 | Huang | |
| 11,351,655 | B1 | 6/2022 | Samuel | |
| 11,415,413 | B2* | 8/2022 | Cook | G01C 9/34 |
| 2007/0281594 | A1 | 12/2007 | Jones | |
| 2015/0174723 | A1 | 6/2015 | Powell | |
| 2017/0173760 | A1 | 6/2017 | Hourmand | |
| 2020/0316748 | A1 | 10/2020 | Persson | |
| 2021/0156686 | A1* | 5/2021 | Cook | G01C 9/34 |
| 2023/0302607 | A1 | 9/2023 | Glesser | |
| 2023/0314132 | A1 | 10/2023 | Wang | |
| 2024/0058923 | A1 | 2/2024 | Klein | |
| 2024/0310170 | A1* | 9/2024 | Palatshe | G01C 9/34 |

OTHER PUBLICATIONS

Knife Sharpening Angle Guide, Aug. 19, 2016 [online], [retrieved Mar. 21, 2024]. Retrieved from internet, https://www.amazon.com/Knife-Sharpening-Angle-Guide-Sharpen/dp/:2016.

Sharpal 196N Angle Pyramid Whetstone Knife Blade Sharpener Sharpening Stone Angle Guide, Aug. 19, 2019 [online], [v retrieved Mar. 21, 2024] https://www.amazon.com/196N-Whetstone . . . .

Klein Tools 935DAG Digital Electronic Level and Angle Gauge, Nov. 1, 2019 [online], [retrieved Mar. 21, 2024] https://www.amazon.com/Kiein-Tools-935DAG-Electronic-Measures/.

* cited by examiner

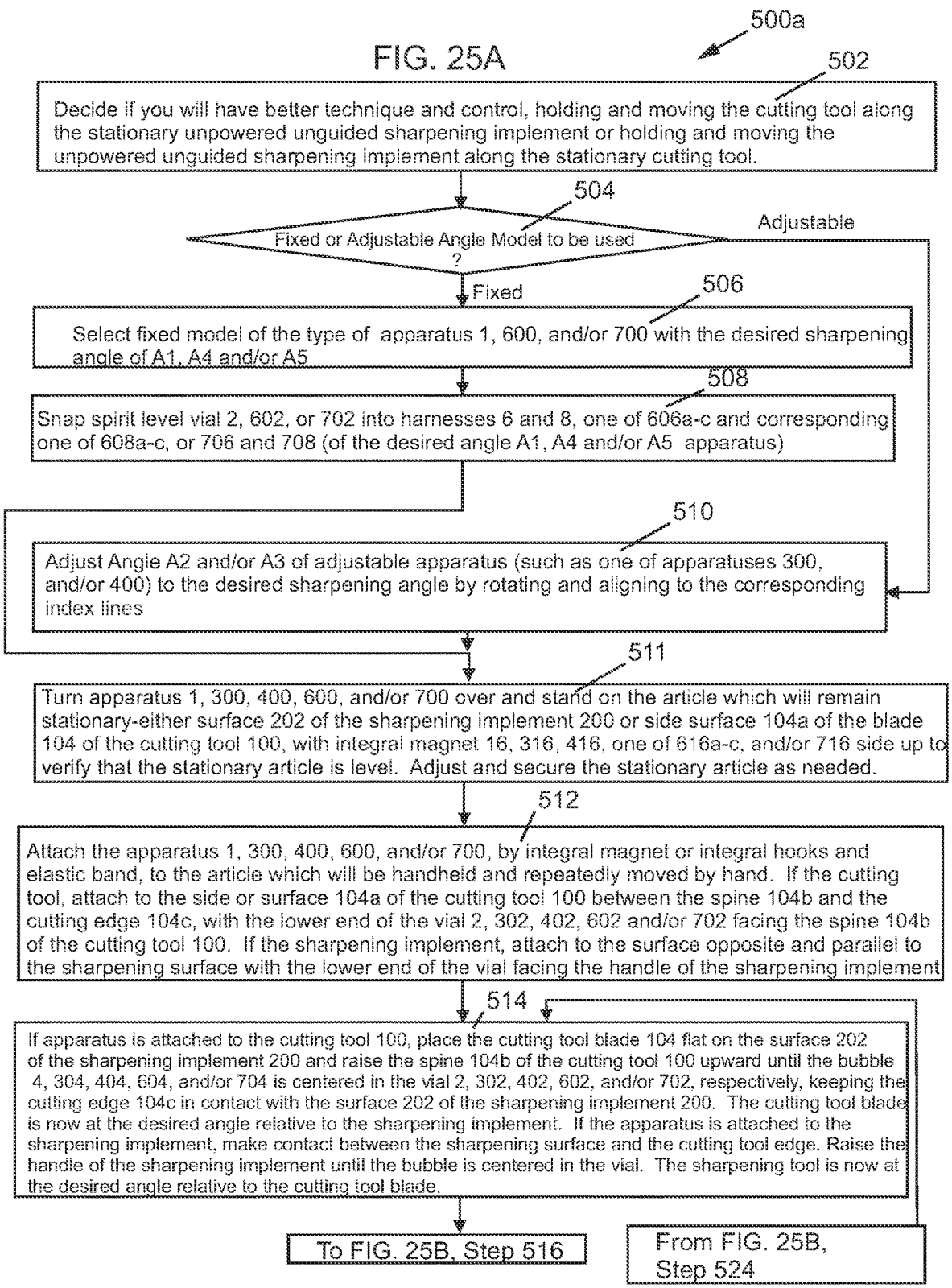

CUTTING TOOL SHARPENING ANGLE AID APPARATUSES AND METHODS

FIELD OF THE INVENTION

This invention relates to devices which aid in the periodic maintenance sharpening of existing cutting tools.

BACKGROUND OF THE INVENTION

Many types of cutting tools exist. Some examples of common manual cutting tools are knives, axes, chisels, shears, wood planes, etc. Through repeated use, the cutting edge on all common manual cutting tools becomes dull. To maintain cutting effectiveness, all common manual cutting tools must undergo periodic maintenance sharpening.

To sharpen a cutting tool effectively one must remove small amounts of metal from one or both sides of the cutting tool edge using an abrasive surface at a consistent and usually prescribed angle of the cutting tool to the sharpening surface.

Many types of sharpening implements exist for periodic maintenance sharpening of cutting tools. Some are powered to move the abrasive surface while others are unpowered. Some have integral guides or rests, to hold the cutting tool at a constant angle relative to the sharpening surface, while others do not have guides or rests. Whetstones (water stones, oil stones, diamond stones) and files are examples of common unpowered unguided sharpening implements. Whetstones are often used for fine sharpening while files are often used to sharpen large cutting tools such as axes.

Unpowered unguided sharpening implements such as whetstones and files are often preferred by experienced professionals as, there are many types and grits, sharpening techniques and motions are not impeded, all sharpening angles are possible, and one has better control of the amount of metal removed from the cutting tool. However, the issue with unpowered unguided sharpening implements is that many users do not have the experience, muscle memory or technique to hold, throughout the sharpening motion, a consistent and prescribed sharpening angle of, the cutting tool to the sharpening surface or the sharpening surface to the cutting tool, needed for satisfactory results.

Cutting tool sharpening angle guides exist to overcome these issues but the current art and the currently available commercial models have their drawbacks. To name a few: wedge type guides, which sit on a whetstone, provide an angle reference at the start of the manual sharpening motion but no reference or feedback once the cutting tool leaves the wedge; clamp type guides, which clamp to the cutting tool, do not fit many cutting tools, impede many manual sharpening motions, do not provide the reference for the full length of many blades and only provide an approximate angle as the sharpening angle changes as the blade width changes.

The present invention addresses these drawbacks in the current art and commercially available models.

SUMMARY OF THE INVENTION

In at least one embodiment, the present invention is intended to assist with periodic manual maintenance sharpening of existing cutting tools such as knives, axes, chisels, shears, wood plane irons, etc. with unpowered unguided sharpening implements such as whetstones (water stones, oil stones and diamond stones) and files by providing the user with constant visual feedback on how they are holding a desired sharpening angle of, the cutting tool blade relative to an unpowered unguided sharpening implement or an unpowered unguided sharpening implement relative to a large cutting tool blade, throughout the entire repetitive manual sharpening motion.

In at least one embodiment, this invention is intended to be attached to the article being held and manually moved—either the cutting tool sharpening against a stationary unpowered unguided sharpening implement or an unpowered unguided sharpening implement sharpening a stationary large cutting tool such as an axe.

In at least one embodiment, an apparatus is provided comprising: a cutting tool sharpening angle aid comprised of: a spirit level vial; a first spirit level vial harness to which the spirit level vial is configured to be attached; a first member to which the spirit level harness is attached; a base which is attached to the first member; and a first attachment device which is configured to attach the base to a blade of a cutting tool.

The first attachment device may be a magnet. The first attachment device may be an elastic band. In at least one embodiment, both a magnet and one or more elastic bands may be used for the first attachment device, and/or a first and a second attachment device may be provided.

The first member may be triangular shaped.

The base may be rotatably attached to the first member or fixed to the first member.

In at least one embodiment, a second member protrudes out from the base; and the base is rotatably attached to the first member through the second member.

In at least one embodiment, the apparatus is further comprised of a thumbscrew; and wherein the thumbscrew is configured to rotate the first member with respect to the base.

In at least one embodiment, a second spirit level vial harness is provided to which the spirit level vial is configured to be attached; wherein the spirit level vial has a first end and a second end; and wherein the first end of the spirit level vial is configured to be attached to the first spirit level harness while the second end of the spirit level harness is attached to the second spirit level harness, to thereby temporarily fix the spirit level vial at a first orientation with respect to the first member.

In at least one embodiment, the apparatus further includes a third spirit level vial harness to which the spirit level vial is configured to be attached; a fourth spirit level vial harness to which the spirit level vial is configured to be attached; a fifth spirit level vial harness to which the spirit level vial is configured to be attached; and a sixth spirit level vial harness to which the spirit level vial is configured to be attached; and wherein the first end of the spirit level vial is configured to be attached to the third spirit level harness while the second end of the spirit level harness is attached to the fourth spirit level harness, to thereby temporarily fix the spirit level vial at a second orientation, which is different from the first orientation, with respect to the first member; and wherein the first end of the spirit level vial is configured to be attached to the fifth spirit level harness while the second end of the spirit level harness is attached to the sixth spirit level harness, to thereby temporarily fix the spirit level vial at a third orientation, which is different from the first and second orientations, with respect to the first member.

A method is provided which includes the step of placing a cutting tool sharpening aid on a cutting tool; wherein the cutting tool sharpening aid may be configured as previously described.

BRIEF DESCRIPTION OF THE DRAWINGS

FIG. 25A is a first part of a flow chart of a method in accordance with an embodiment of the present invention.

DETAILED DESCRIPTION OF THE DRAWINGS

Figure 1:
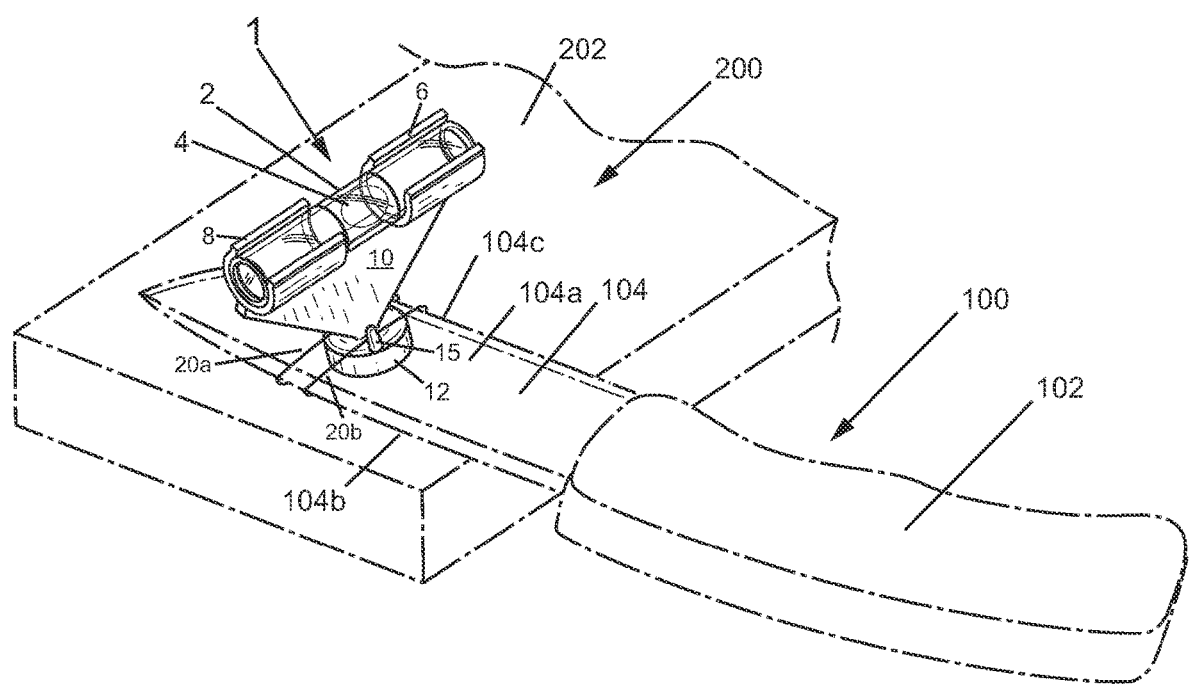
FIG. 1 is a rear, right, and top perspective view of a fixed angle cutting tool sharpening aid apparatus 1 placed on a cutting tool blade in accordance with an embodiment of the present invention.

FIG. 1 is a rear, right, and top perspective view of a fixed angle cutting tool sharpening aid apparatus 1 placed on a top surface 104a of a blade 104 of a cutting tool 100 in accordance with an embodiment of the present invention.

Figure 2:
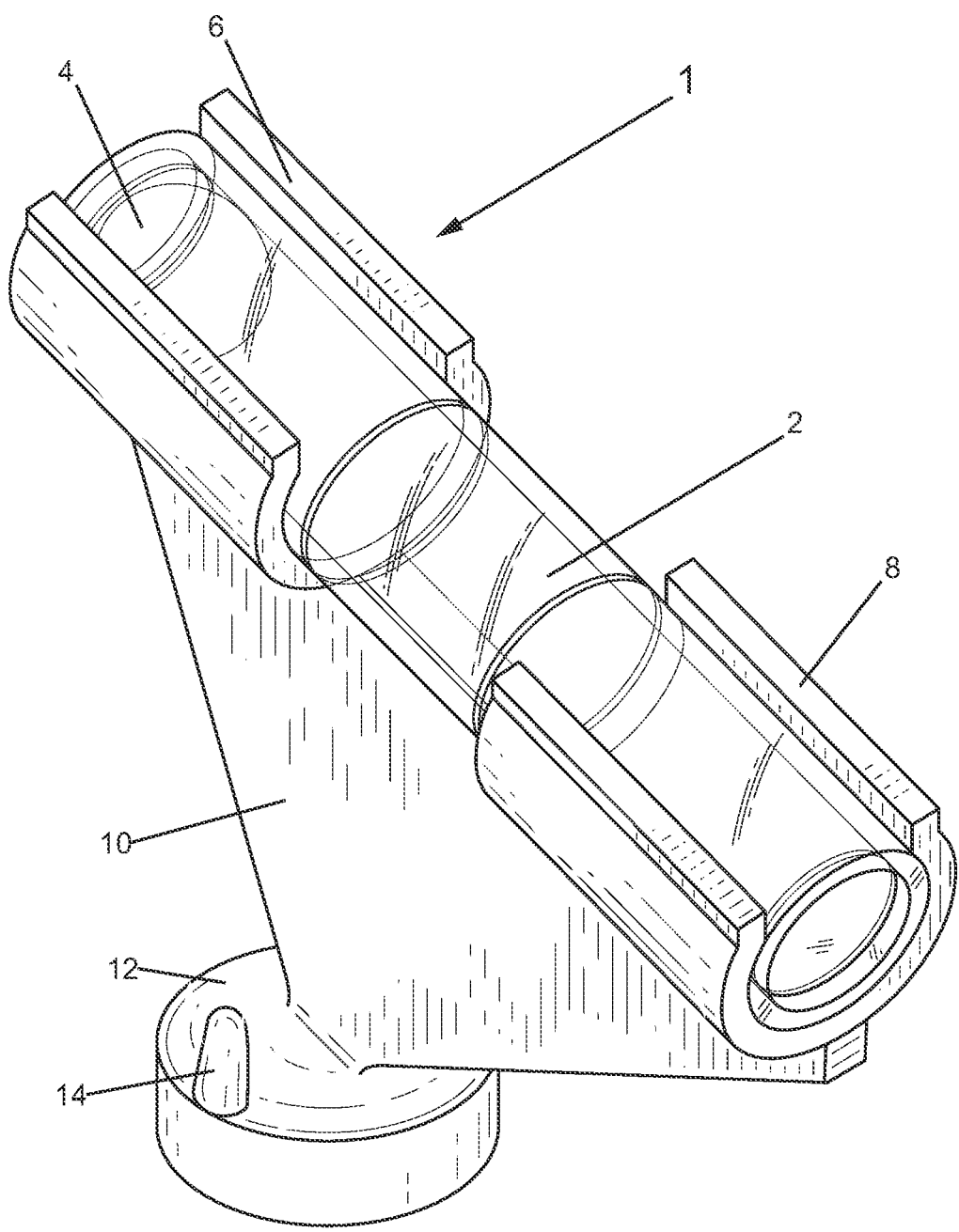
FIG. 2 is a rear, left, and top perspective view of the fixed angle cutting tool sharpening aid apparatus of FIG. 1.
Figure 3:
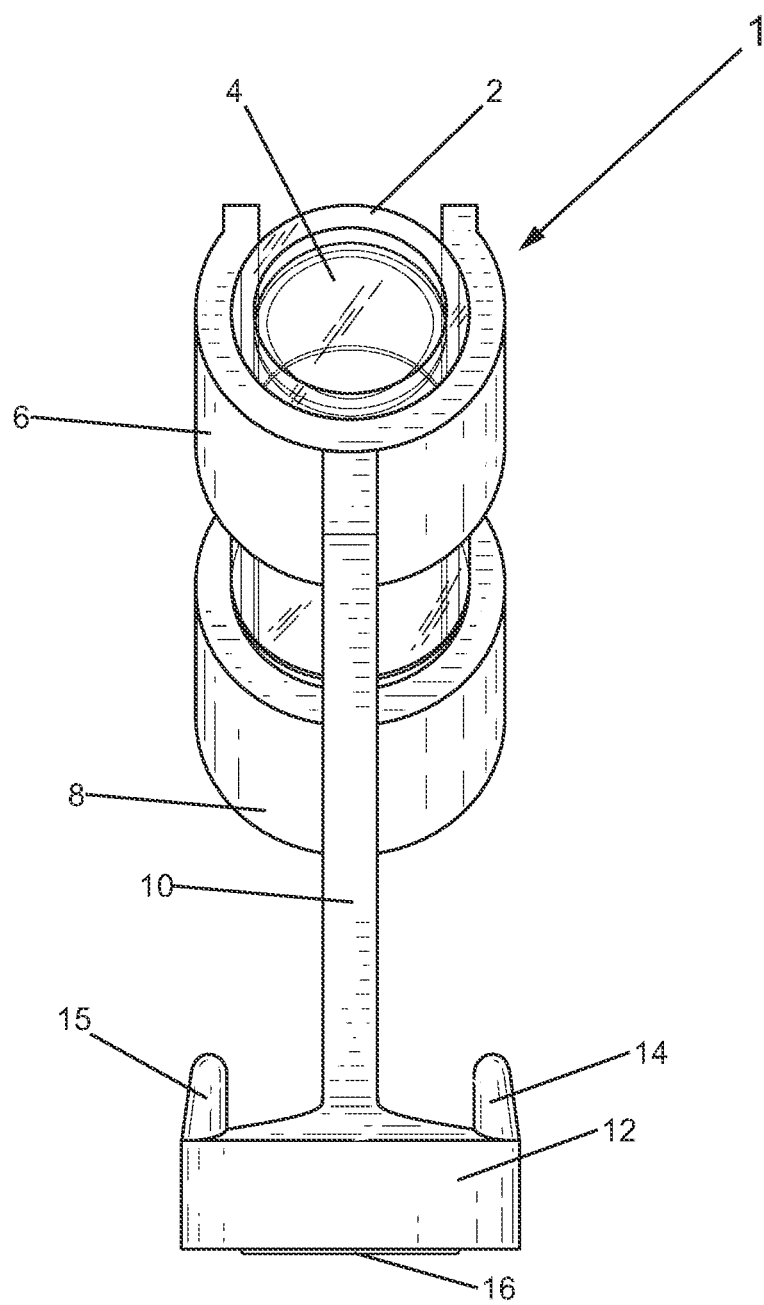
FIG. 3 is a front elevational view of the fixed angle cutting tool sharpening aid apparatus of FIG. 1.
Figure 4:
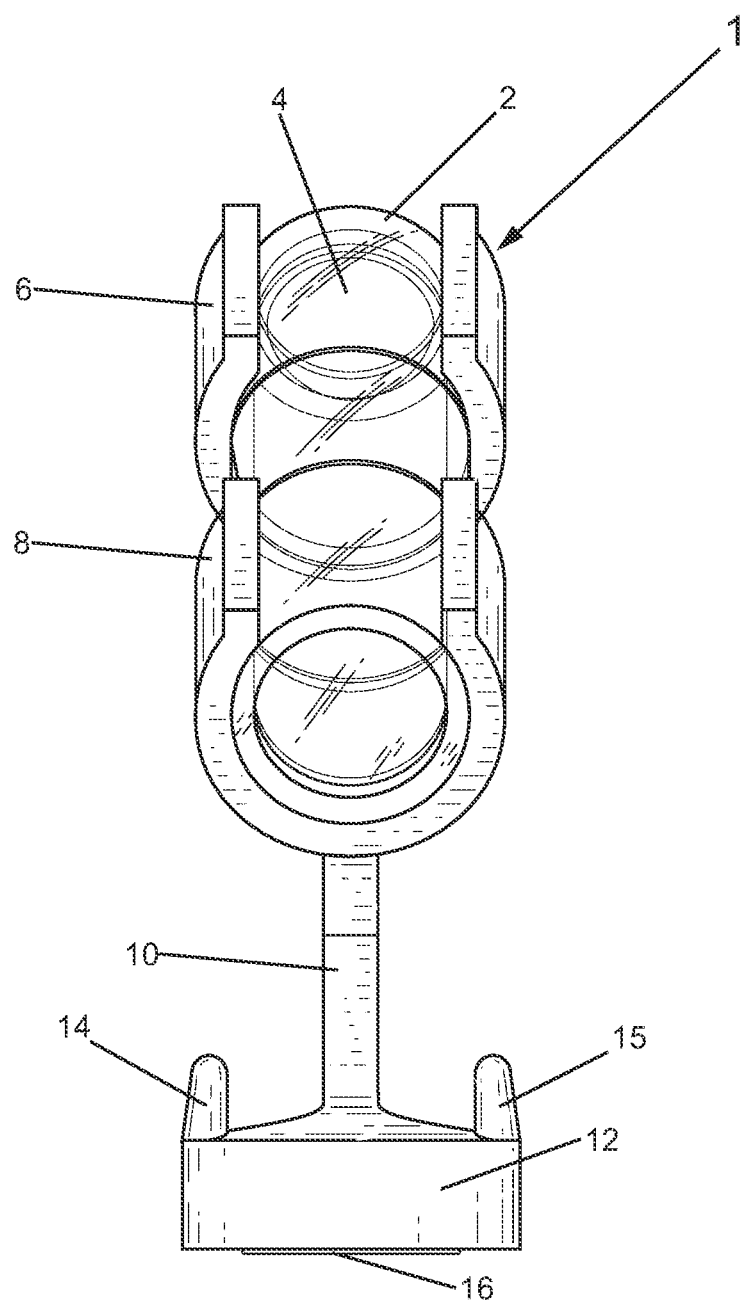
FIG. 4 is a rear elevational view of the fixed angle cutting tool sharpening aid apparatus of FIG. 1.
Figure 5:
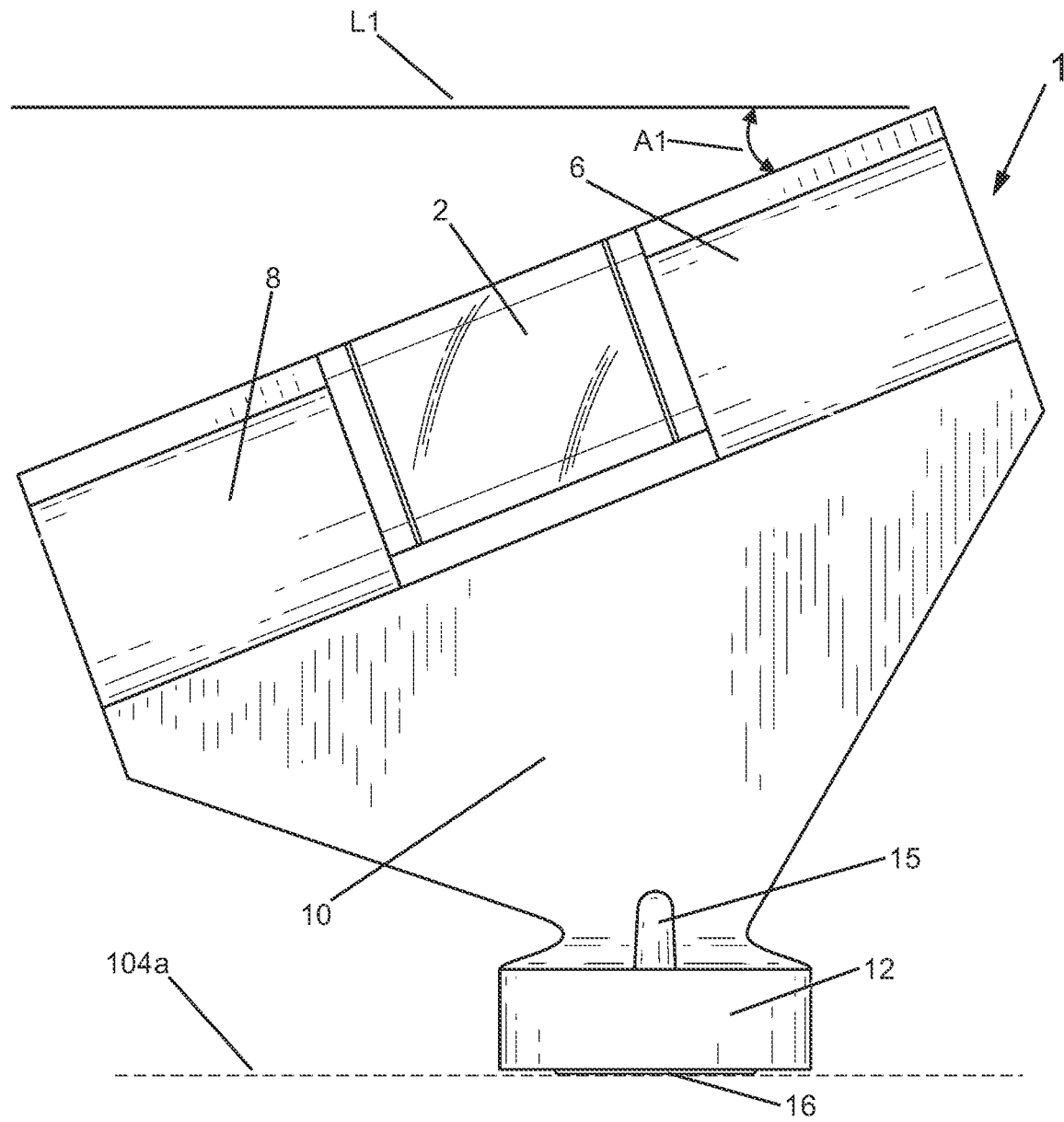
FIG. 5 is a right side elevational view of the fixed angle cutting tool sharpening aid apparatus of FIG. 1.
Figure 6:
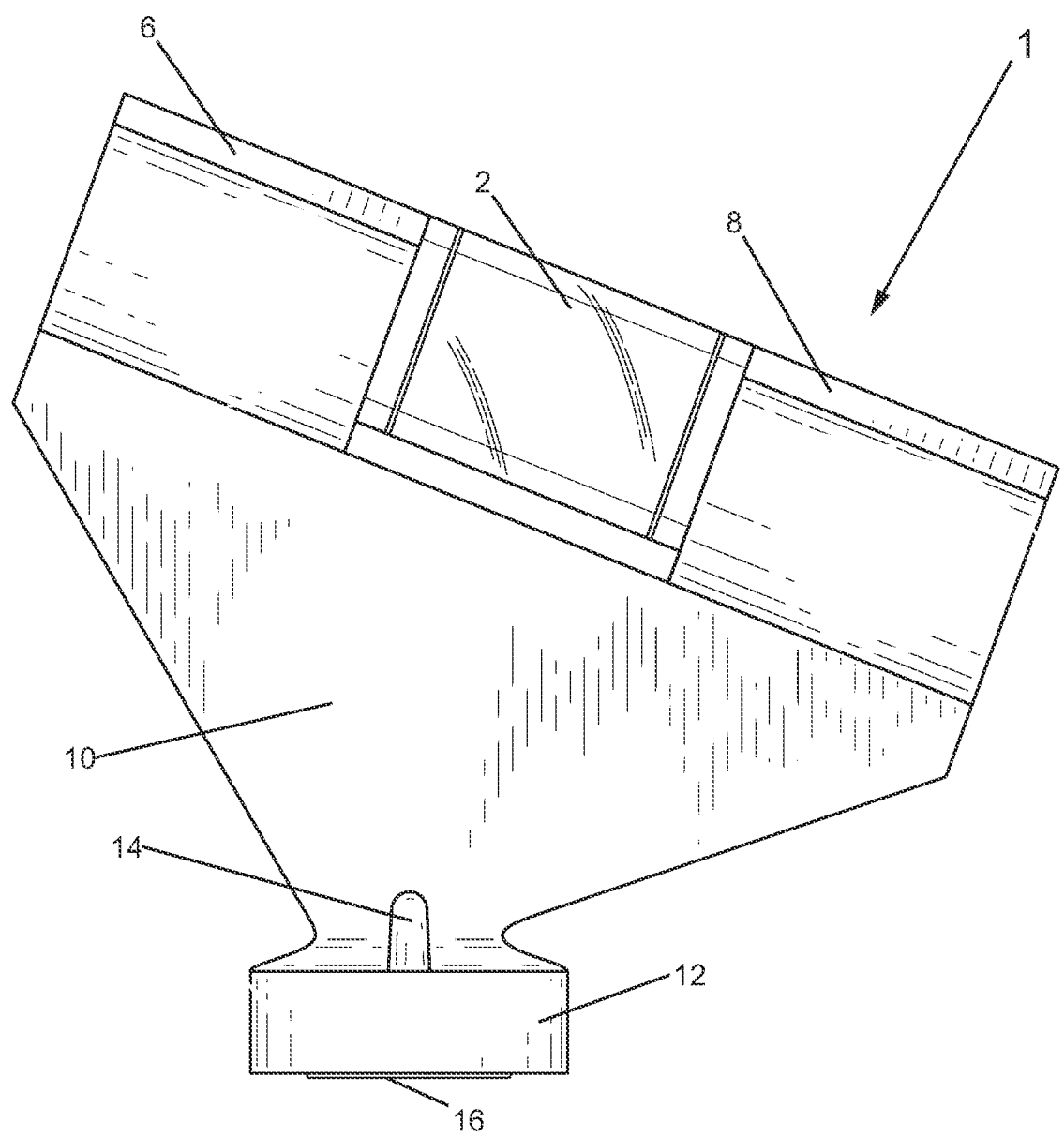
FIG. 6 is a left side elevational view of the fixed angle cutting tool sharpening aid apparatus of FIG. 1.
Figure 7:
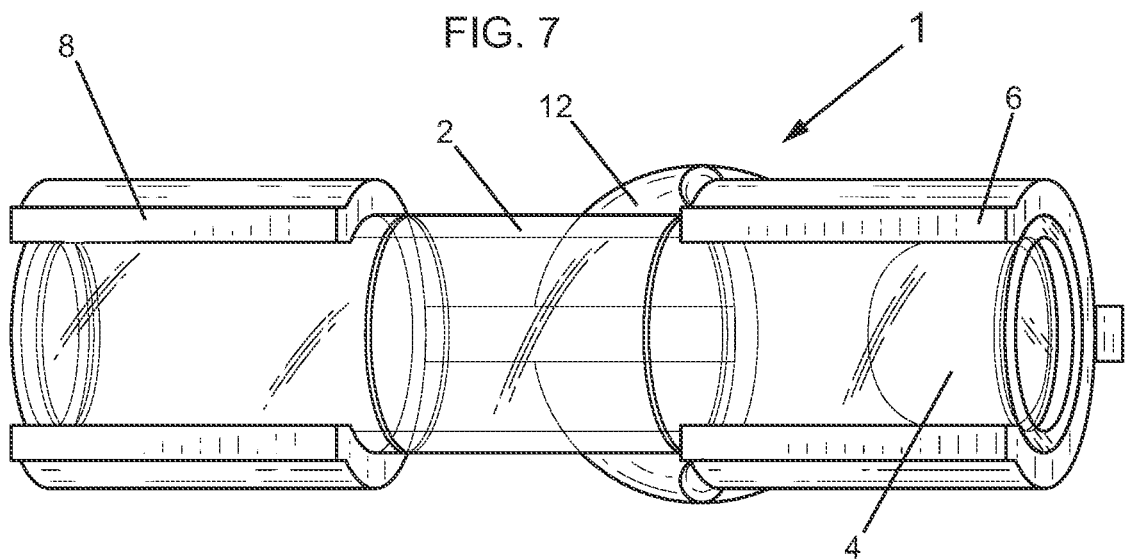
FIG. 7 is a top plan view of the fixed angle cutting tool sharpening aid apparatus of FIG. 1.
Figure 8:
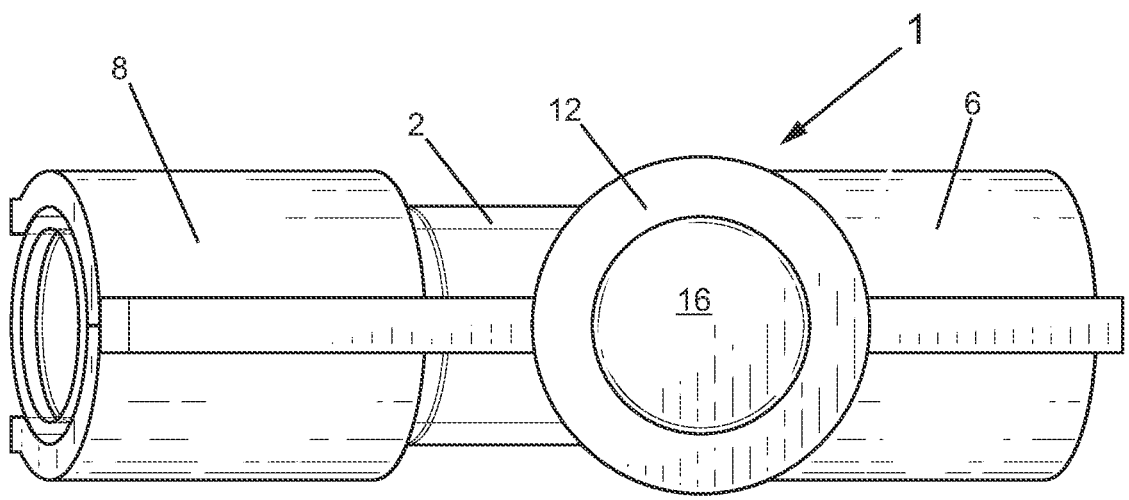
FIG. 8 is a bottom plan view of the fixed angle cutting tool sharpening aid apparatus of FIG. 1.

FIG. 2 is a rear, left, and top perspective view of the fixed angle cutting tool sharpening aid apparatus 1 of FIG. 1. FIG. 5 is a right side elevational view of the fixed angle cutting tool sharpening aid apparatus 1 of FIG. 1. FIG. 6 is a left side elevational view of the fixed angle cutting tool sharpening aid apparatus 1 of FIG. 1. FIG. 3 is a front elevational view of the fixed angle cutting tool sharpening aid apparatus 1 of FIG. 1. FIG. 4 is a rear elevational view of the fixed angle cutting tool sharpening aid apparatus 1 of FIG. 1. FIG. 7 is a top plan view of the fixed angle cutting tool sharpening aid apparatus 1 of FIG. 1. FIG. 8 is a bottom plan view of the fixed angle cutting tool sharpening aid apparatus 1 of FIG. 1.

Referring to FIGS. 1-8, The fixed angle cutting tool sharpening aid apparatus 1 includes a spirit level vial 2 in which a bubble 4 moves. The fixed angle cutting tool sharpening aid apparatus 1 further includes a spirit level vial harness 6 and a spirit level vial harness 8, which are fixed to a member or projection 10. The member or projection 10 is fixed to a base 12. The member 10 may be substantially or exactly triangular in shape. There are projections or protrusions 14 and 15 which extend from base 12, shown in FIG. 3, which a user provided elastic band hooks on to attach the apparatus 1 to a non-ferrous or non-magnetic surface such as that of a cutting tool with a ceramic blade or a whetstone. A magnet 16 is fixed to the bottom of base 12. The magnet 16 is used to detachably attach the fixed angle cutting tool sharpening aid apparatus 1 to the surface 104a of the blade 104 of the cutting tool 100 as shown in FIG. 1. The fixed level apparatus 1 is attached in FIG. 1 to the surface 104a, and the surface 104a is angled with respect to a surface 202 of a unpowered unguided sharpening implement 200, so that the surface 104a makes an angle of 20.0 degrees, for example, (depending on the unit) with respect to the surface 202 of the unpowered unguided sharpening implement 200. This is a common angle to sharpen an edge 104c of the blade 104. The edge 104c is opposite a non sharp edge or spine 104b of the blade 104.

As shown in FIG. 5, the spirit level vial 2, in which the bubble 4 moves, is at an angle of A1 (the user desired sharpening angle) with respect to the surface of magnet 16 in base 12. Therefore, when attached to cutting tool side surface 104a (shown in dashed lines and parallel to line L1) the spirit level vial is at angle A1 relative to surface 104a. When the apparatus 1 is positioned on the surface 104a of the cutting tool blade 104 with the lower end of the spirit level vial 2 facing the spine 104b, raising the spine 104b of the cutting tool blade 104 until the bubble 4 is centered in the spirit level vial 2 puts the cutting tool at the user desired angle A1 relative to a level unpowered unguided sharpening implement 200 surface 202. At this point the manual repetitive sharpening motions can begin with the user simultaneously raising or lowering the spine 104b as needed to keep the bubble 4 centered in the spirit level vial 2 to maintain the desired sharpening angle.

Figure 9:
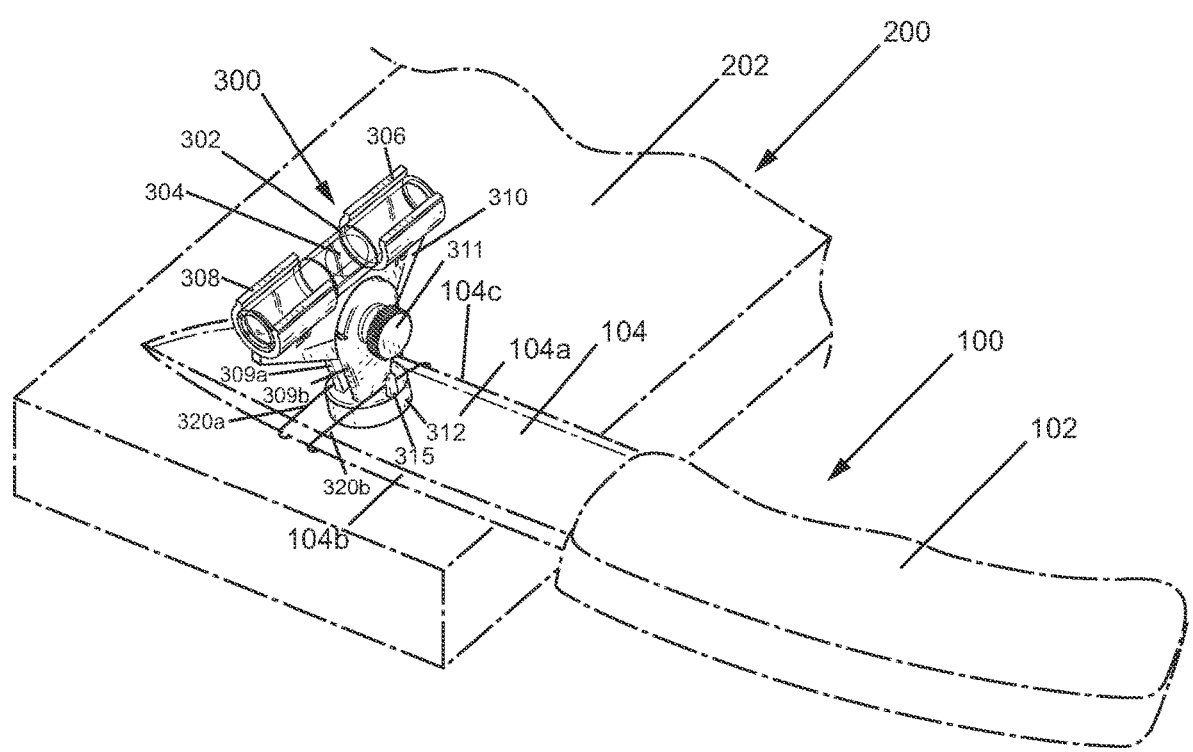
FIG. 9 is a rear, right, and top perspective view of an adjustable angle cutting tool sharpening aid apparatus 300 placed on a blade of a cutting tool in accordance with another embodiment of the present invention.

FIG. 9 is a rear, right, and top perspective view of an adjustable angle cutting tool sharpening aid apparatus 300 placed on the top surface 104a of the blade 104 of a cutting tool 100 in accordance with another embodiment of the present invention.

Figure 10:
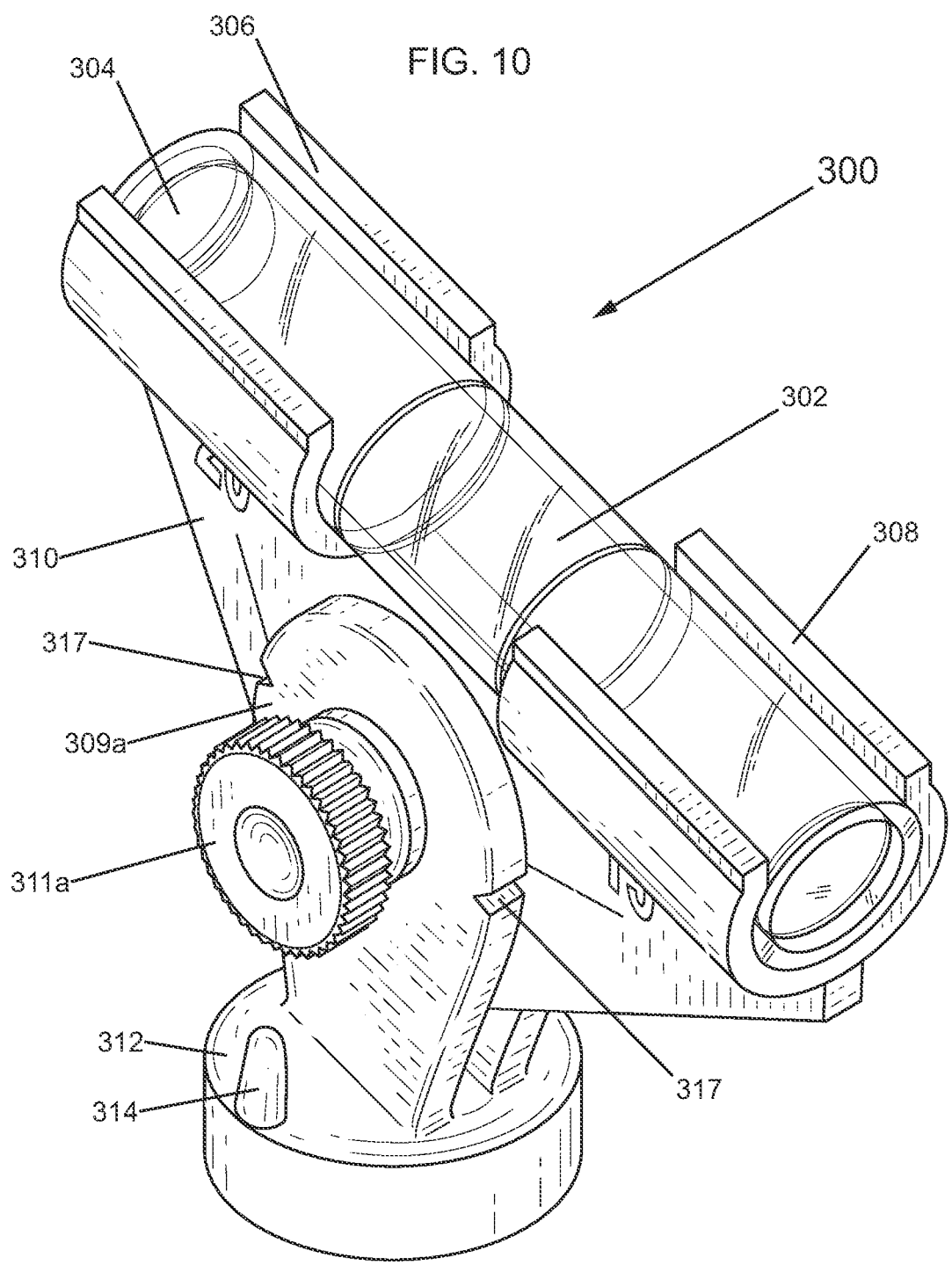
FIG. 10 is a rear, left, and top perspective view of the adjustable angle cutting tool sharpening aid apparatus of FIG. 9.
Figure 11:
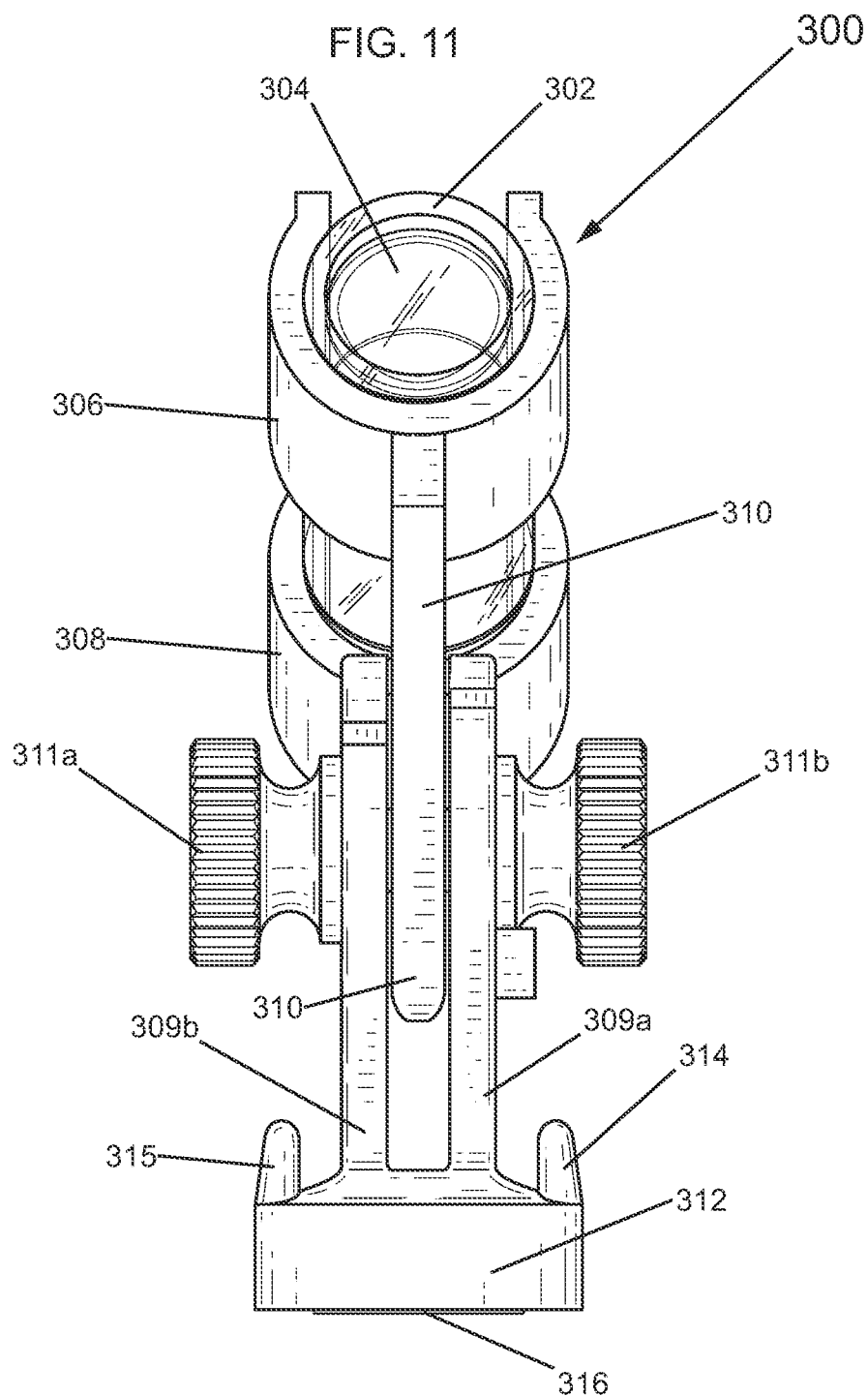
FIG. 11 is a front elevational view of the adjustable angle cutting tool sharpening aid apparatus of FIG. 9.
Figure 12:
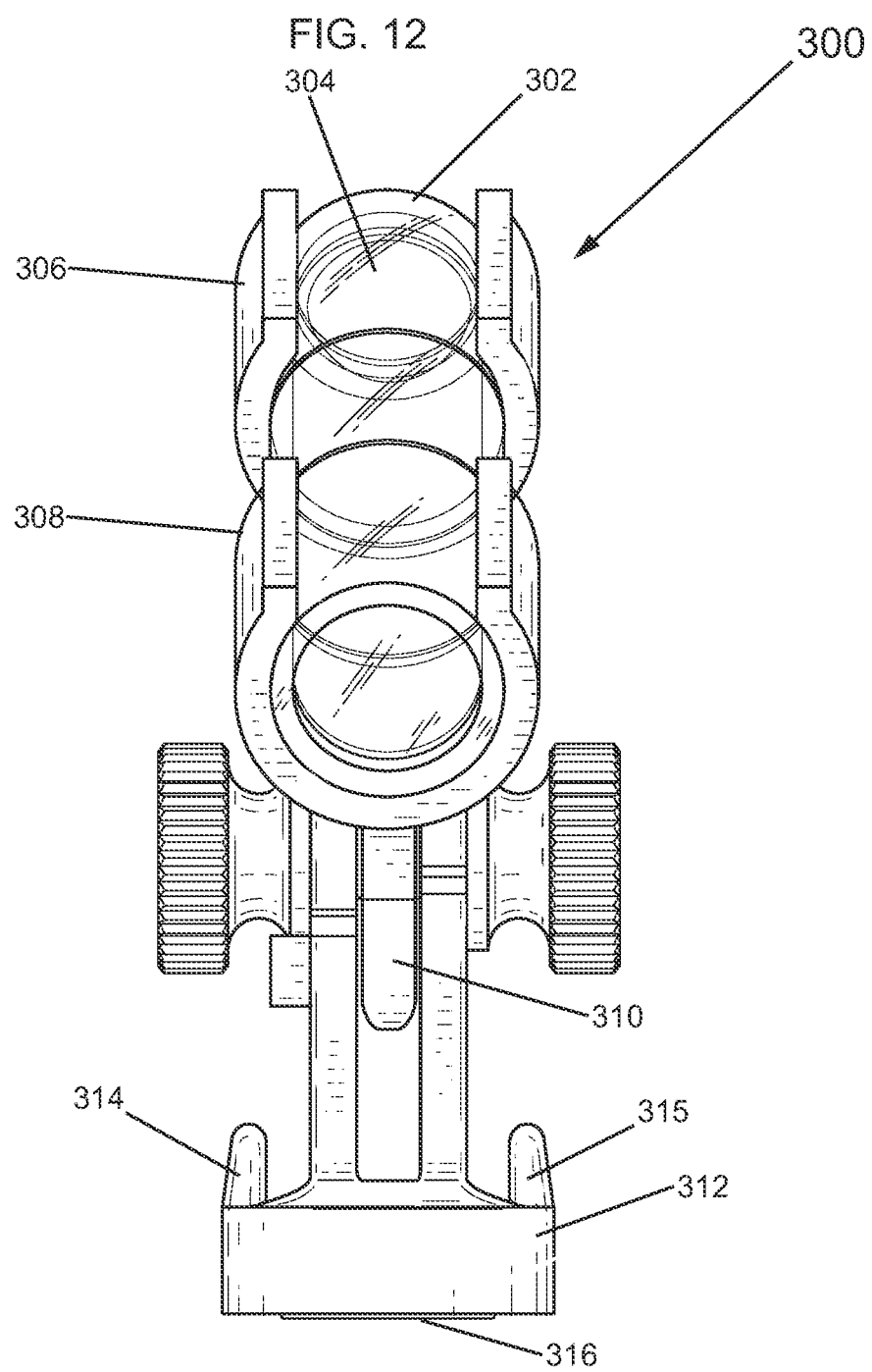
FIG. 12 is a rear elevational view of the adjustable angle cutting tool sharpening aid apparatus of FIG. 9.
Figure 13:
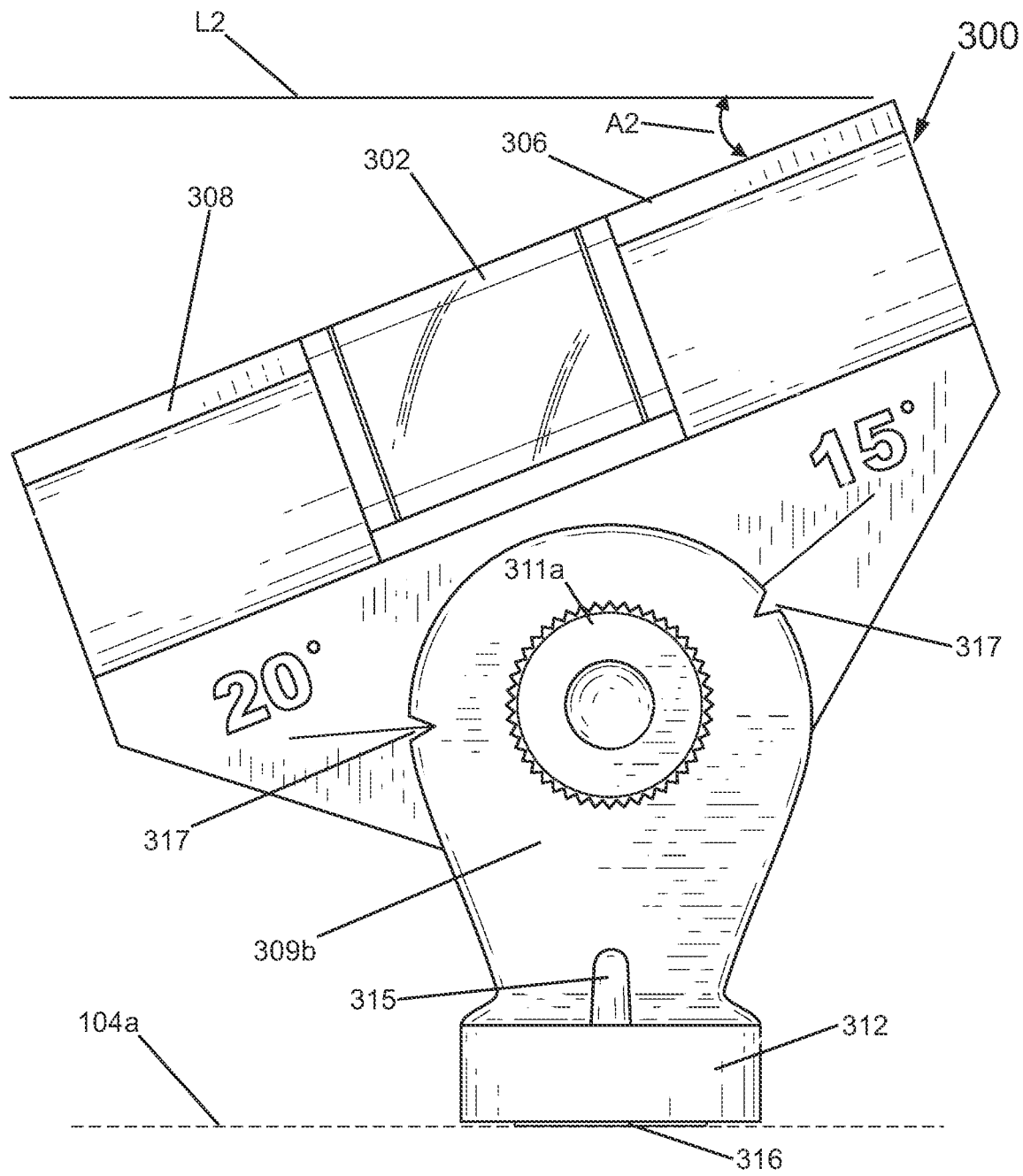
FIG. 13 is a right side elevational view of the adjustable angle cutting tool sharpening aid apparatus of FIG. 9.
Figure 14:
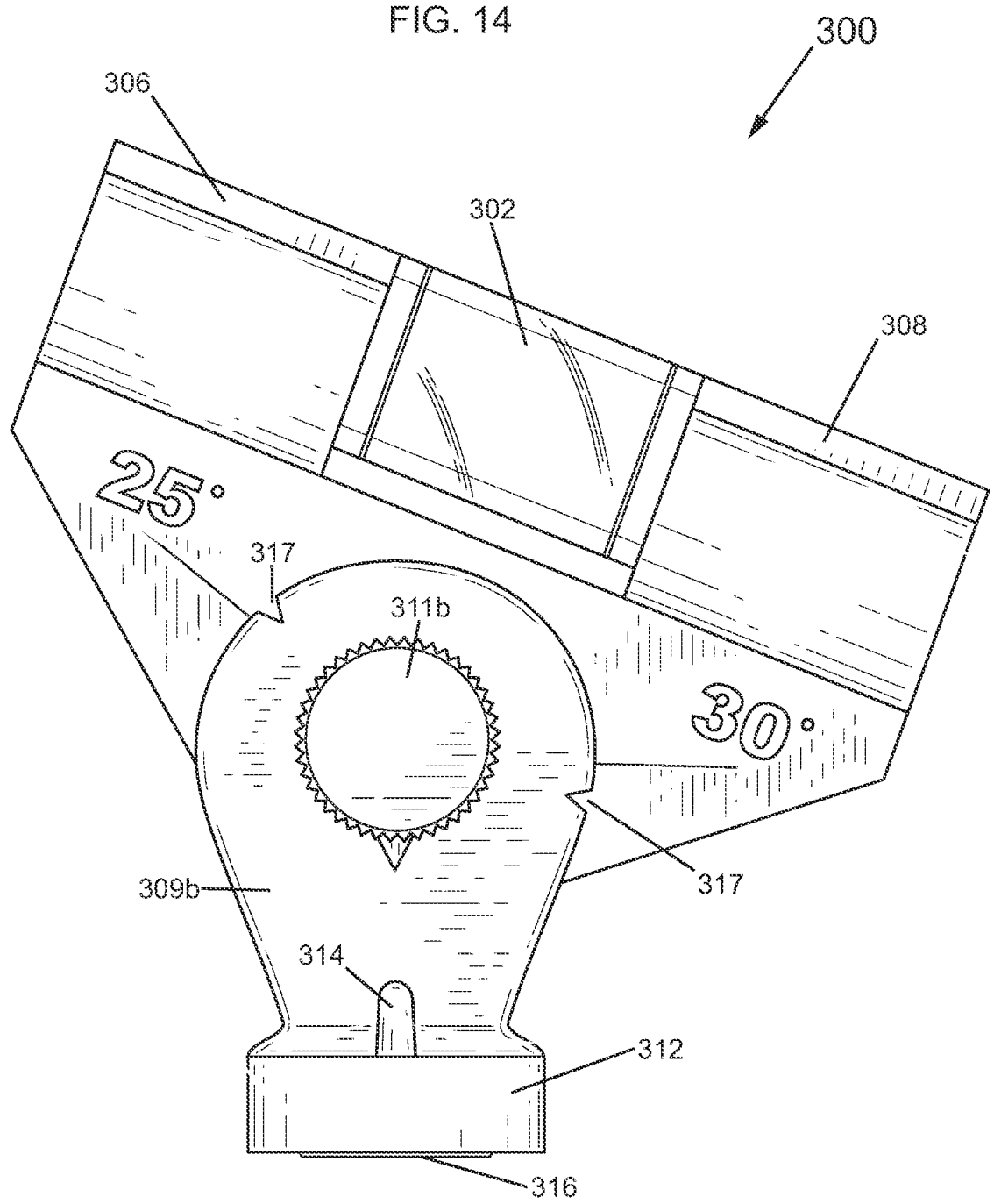
FIG. 14 is a left side elevational view of the adjustable angle cutting tool sharpening aid apparatus of FIG. 9.
Figure 15:
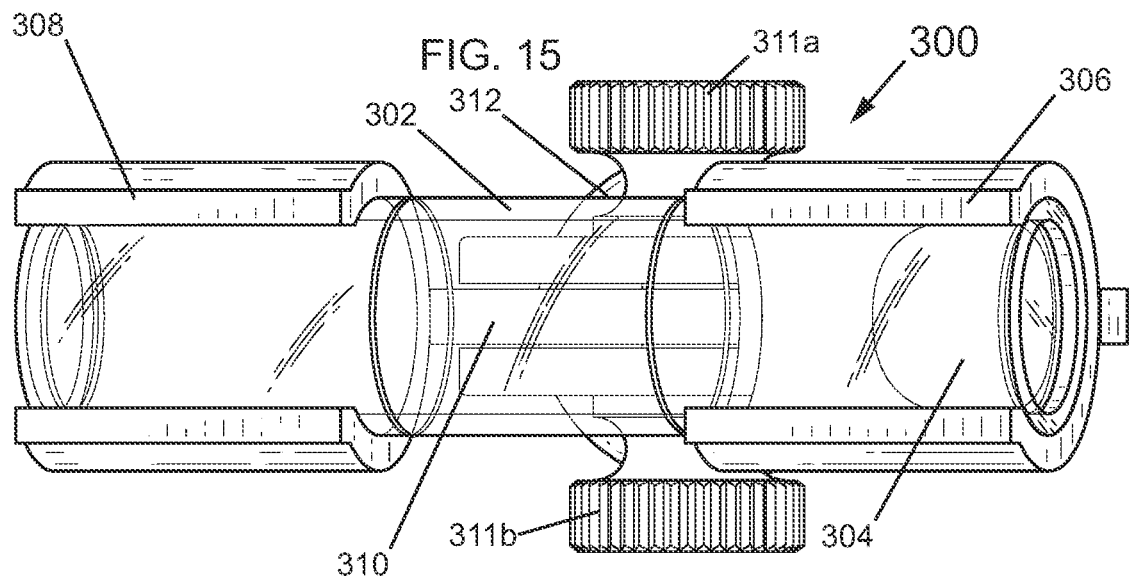
FIG. 15 is a top plan view of the adjustable angle cutting tool sharpening aid apparatus of FIG. 9.
Figure 16:
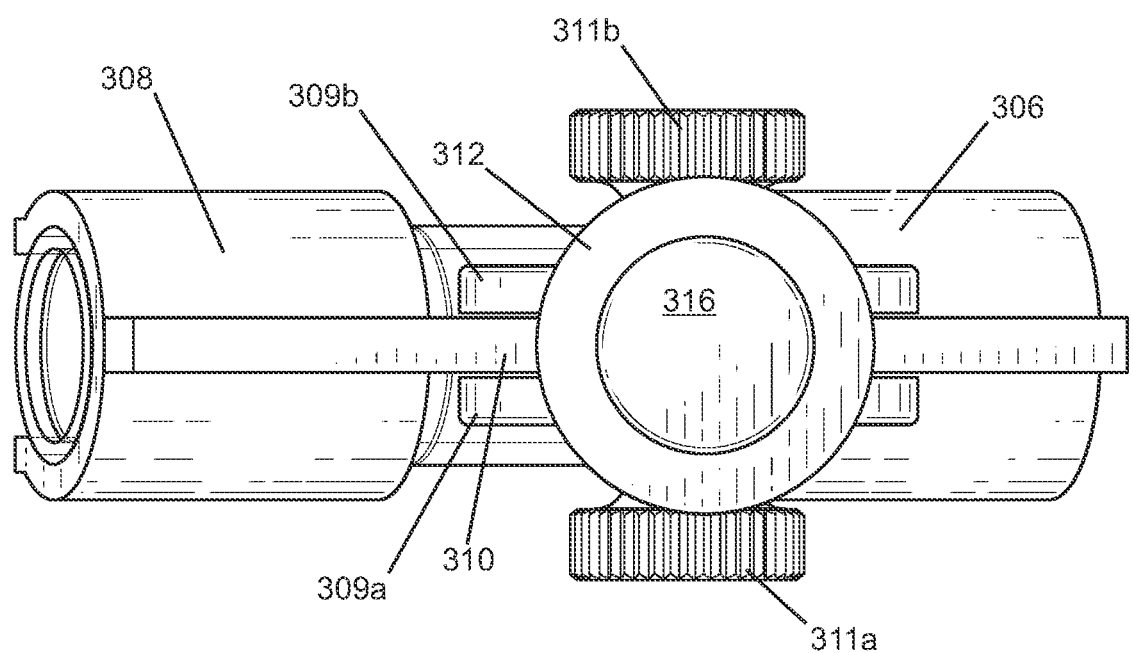
FIG. 16 is a bottom plan view of the adjustable angle cutting tool sharpening aid apparatus of FIG. 9.

FIG. 10 is a rear, left, and top perspective view of the adjustable angle cutting tool sharpening aid apparatus 300 of FIG. 9. FIG. 13 is a right side elevational view of the adjustable angle cutting tool sharpening aid apparatus 300 of FIG. 9. FIG. 14 is a left side elevational view of the adjustable angle cutting tool sharpening aid apparatus 300 of FIG. 9. FIG. 11 is a front elevational view of the adjustable angle cutting tool sharpening aid apparatus 300 of FIG. 9. FIG. 12 is a rear elevational view of the adjustable angle cutting tool sharpening aid apparatus 300 of FIG. 9. FIG. 15 is a top plan view of the adjustable angle cutting tool sharpening aid apparatus 300 of FIG. 9. FIG. 16 is a bottom plan view of the adjustable angle cutting tool sharpening aid apparatus 300 of FIG. 9.

Referring to FIGS. 9-16, The adjustable angle cutting tool sharpening aid apparatus 300 includes a spirit level vial 302 in which a bubble 304 moves. The adjustable angle cutting tool sharpening aid apparatus 300 further includes a spirit level vial harness 306 and a spirit level vial harness 308, which are fixed to a member or projection 310. The member or projection 310 is rotatably mounted with a knurled nut 311a and thumbscrew 311b to members or protrusions 309a and 309b, which the member 310 sandwiched between the members 309a and 309b, as shown for example in FIG. 11.

The members 309a and 309b are fixed to base 312. The member 310 may be substantially or exactly triangular in shape. There are projections or protrusions 314 and 315 which extend from base 312, shown in FIG. 11, which a user provided elastic band hooks on to attach the apparatus 300 to non-ferrous non-magnetic surfaces such as that of a cutting tool with a ceramic blade or a whetstone. A magnet 316 is fixed to the bottom of base 312. The magnet 316 is used to detachably attach the adjustable angle cutting tool sharpening aid apparatus 300 to the surface 104a of the blade 104 of the cutting tool 100 as shown in FIG. 9. The adjustable angle cutting tool sharpening aid apparatus 300 is attached in FIG. 9 to the surface 104a, and the surface 104a is held at an angle with respect to the top surface 202 of a leveled unpowered unguided sharpening implement 200, so that the surface 104a makes the desired sharpening angle with respect to the surface 202 of the unpowered unguided sharpening implement 200. This is the sharpening angle of edge 104c of the blade 104. The edge 104c is opposite a non sharp edge or spine 104b of the blade 104.

As shown in FIG. 13, the spirit level vial 302, in which the bubble 304 moves, is at an angle of A2 (the user desired sharpening angle) with respect to the surface of magnet 316 in base 312. Therefore, when attached to cutting tool side surface 104a (shown in dashed lines and parallel to line L2) the spirit level vial is at angle A2 relative to surface 104a. When the apparatus is positioned on the surface 104a of the cutting tool blade 104 with the lower end of the spirit level vial 302 facing the spine 104b, raising the spine 104b of the cutting tool blade 104 until the bubble 304 is centered in the spirit level vial 302 puts the cutting tool at the user desired angle A2 relative to a level unpowered unguided sharpening implement 200 surface 202. At this point the manual repetitive sharpening motions can begin with the user simultaneously raising or lowering the spine 104b as needed to keep the bubble 304 centered in the spirit level vial 302 to maintain the desired sharpening angle.

In at least one embodiment, one or both of the knurled nut 311a and thumbscrew 311b shown in FIG. 11 may be turned and loosened, in order to allow the orientation of the spirit level vial 302, to be adjusted with respect to the fixed members 309b and 309a, and the base magnet 316. The desired angle of the spirit level vial 302 relative to the base magnet 316 is set by aligning the index line with value, on member 310, to the nearest index grove 317. After adjusting the orientation of the spirit level vial 302, which results in adjusting the angle A2 shown in FIG. 13, the knurled nut 311a and thumbscrew 311b are tightened to temporarily fixed the orientation of the spirit level vial 302 with respect to the surface of base magnet 316, and as a result to fix the angle A2 with respect to the surface 104a of the blade 104, when the apparatus 300 is attached to the blade 104 as in FIG. 9.

Figure 17:
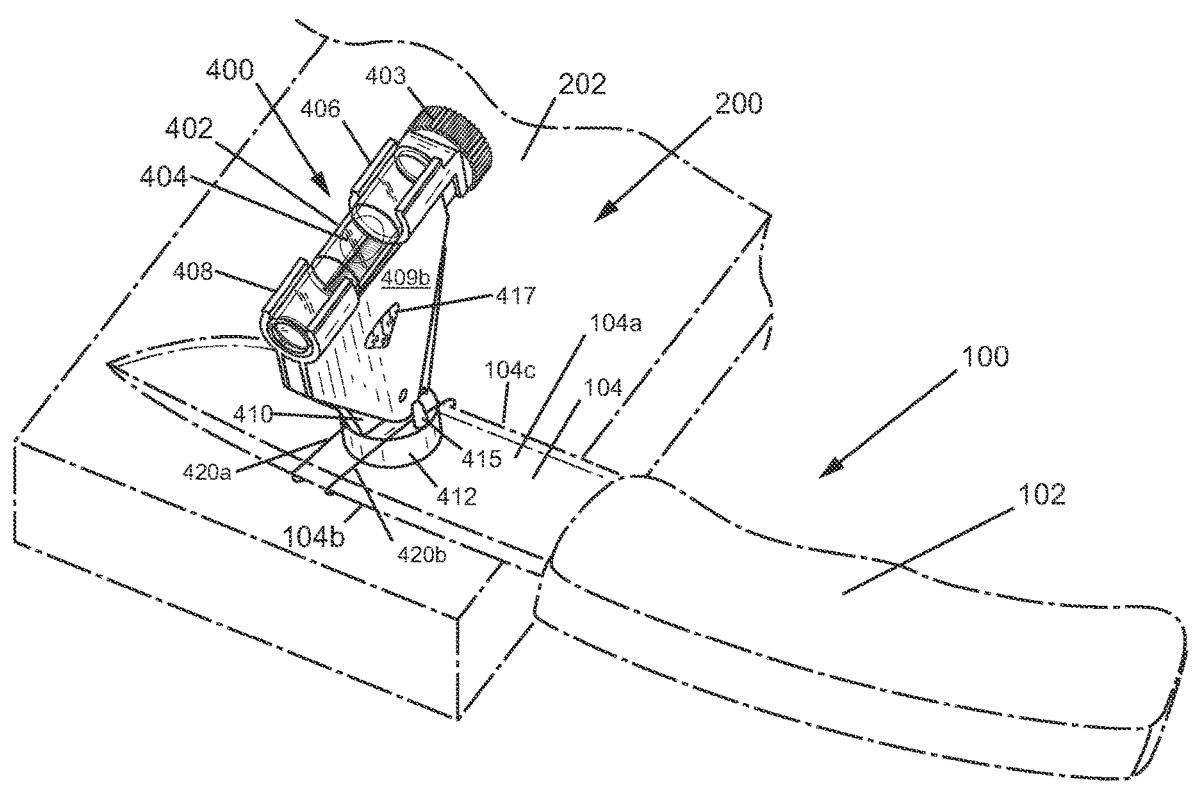
FIG. 17 is a rear, right, and top perspective view of an adjustable angle cutting tool sharpening aid apparatus 400 placed on a blade of a cutting tool, in accordance with another embodiment of the present invention.

FIG. 17 is a rear right, and top perspective view of an adjustable angle cutting tool sharpening aid apparatus 400 placed on the top surface 104a of the blade 104 of a cutting tool 100 in accordance with another embodiment of the present invention.

Figure 18:
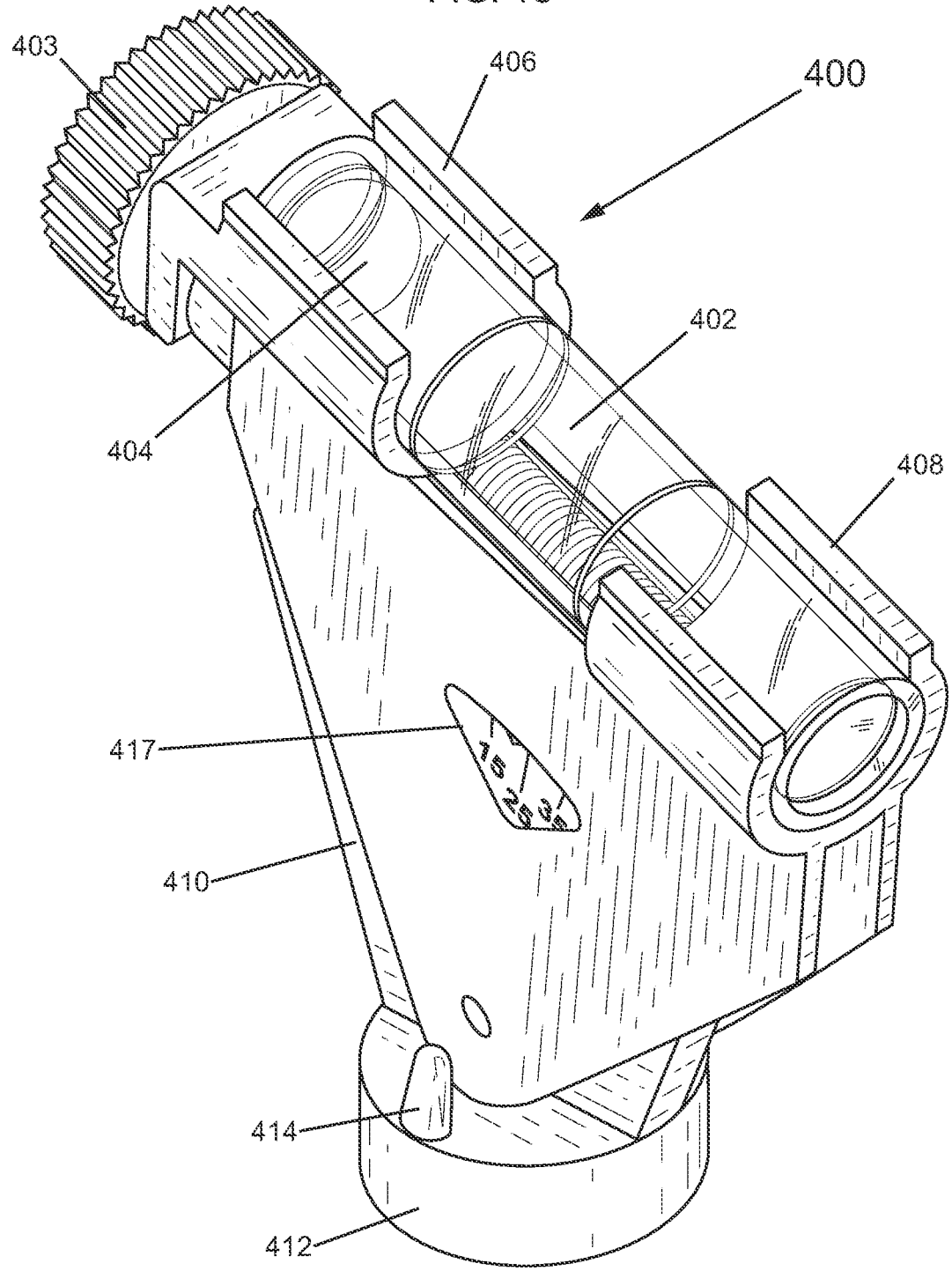
FIG. 18 is a rear, left, and top perspective view of the adjustable angle cutting tool sharpening aid apparatus of FIG. 17.
Figure 19:
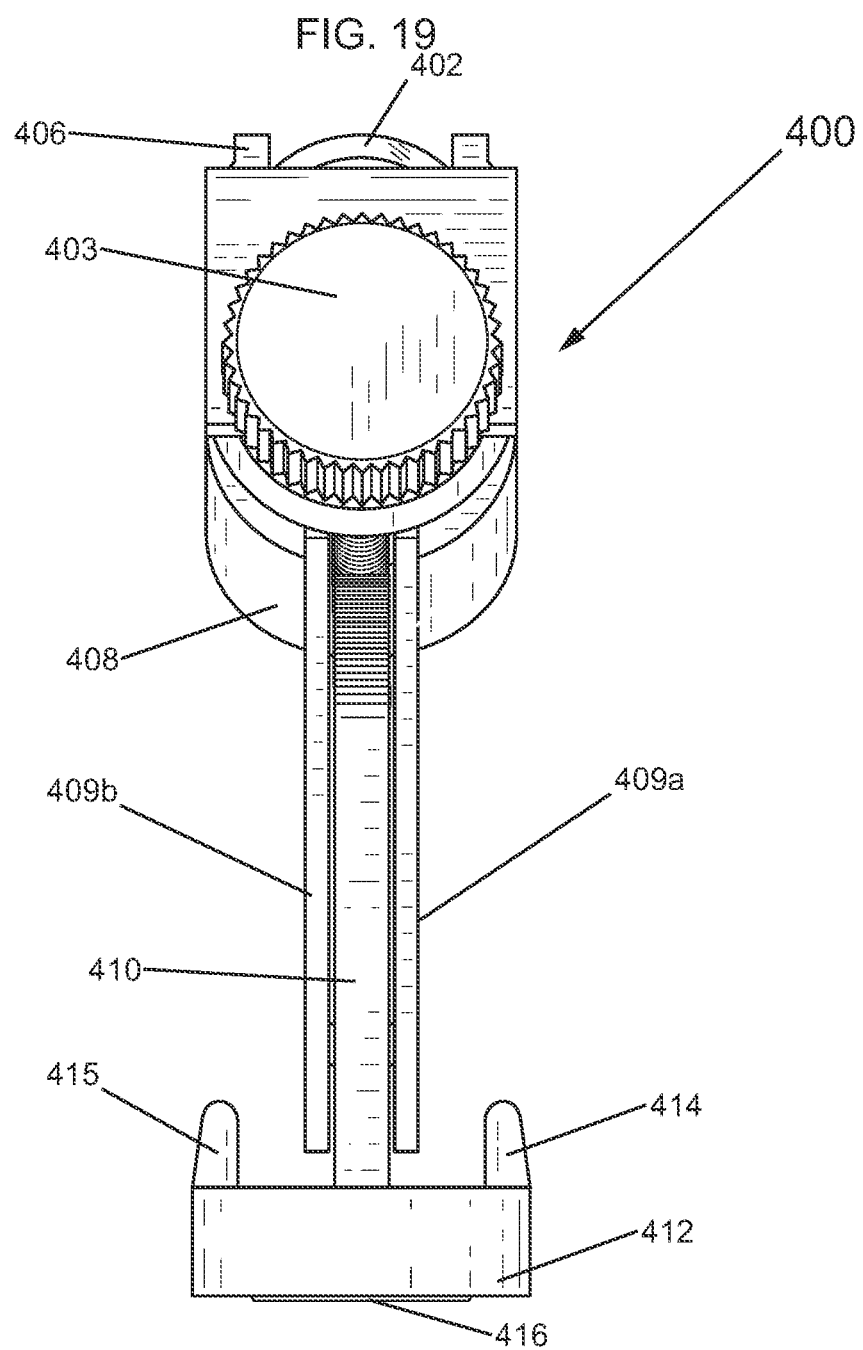
FIG. 19 is a front elevational view of the adjustable angle cutting tool sharpening aid apparatus of FIG. 17.
Figure 21:
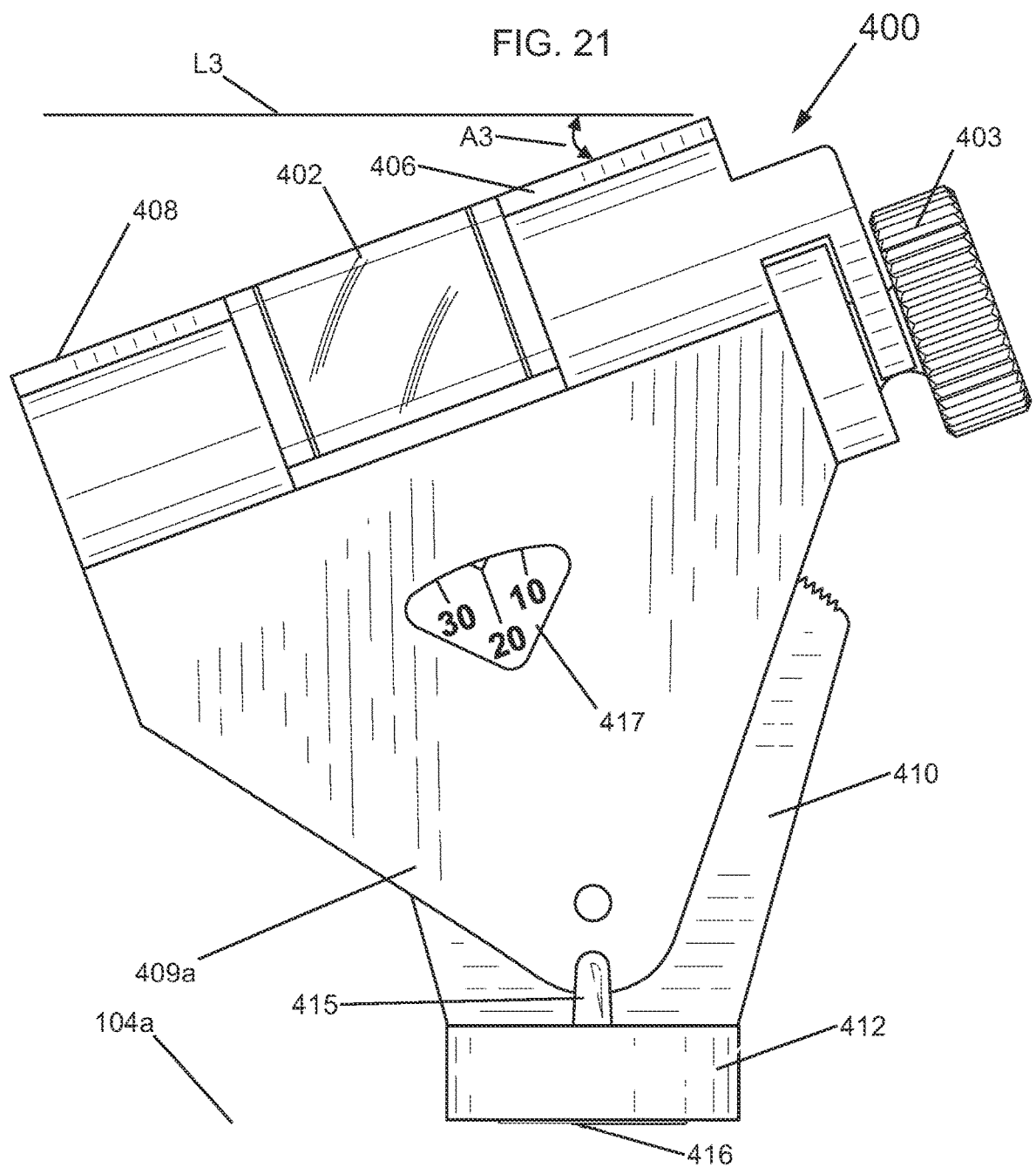
FIG. 21 is a right side elevational view of the adjustable angle cutting tool sharpening aid apparatus of FIG. 17.
Figure 22:
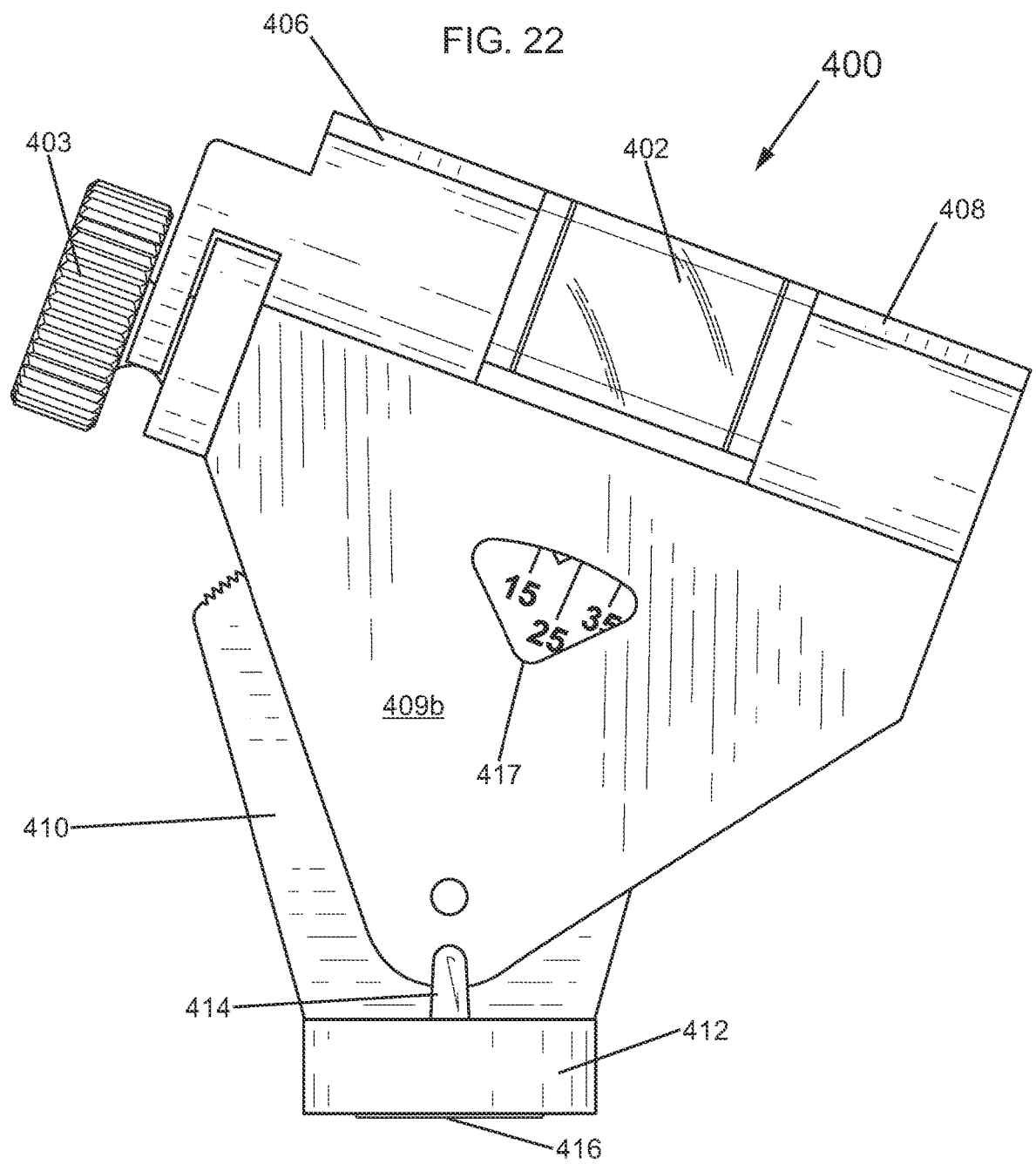
FIG. 22 is a left side elevational view of the adjustable angle cutting tool sharpening aid apparatus of FIG. 17.
Figure 23:
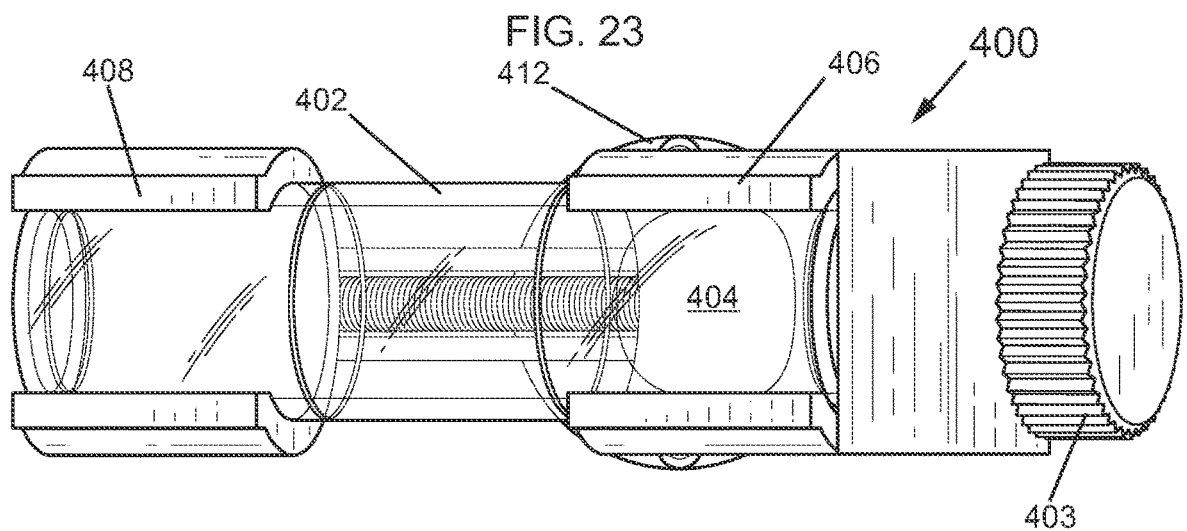
FIG. 23 is a top plan view of the adjustable angle cutting tool sharpening aid apparatus of FIG. 17.
Figure 24:
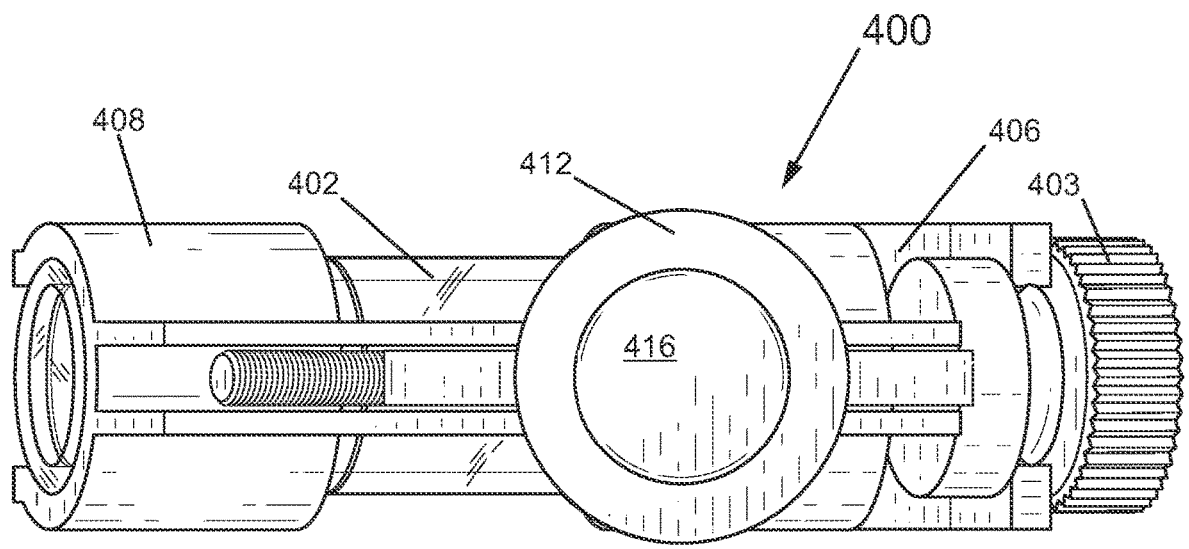
FIG. 24 is a bottom plan view of the adjustable angle cutting tool sharpening aid apparatus of FIG. 17.

FIG. 18 is a rear, left, and top perspective view of the adjustable angle cutting tool sharpening aid apparatus 400 of FIG. 17. FIG. 21 is a right side elevational view of the adjustable angle cutting tool sharpening aid apparatus 400 of FIG. 17. FIG. 22 is a left side elevational view of the adjustable angle cutting tool sharpening aid apparatus 400 of FIG. 17. FIG. 19 is a front elevational view of the adjustable angle cutting tool sharpening aid apparatus 400 of FIG. 17. FIG. is a rear elevational view of the adjustable angle cutting tool sharpening aid apparatus 400 of FIG. 17. FIG. 23 is a top plan view of the adjustable angle cutting tool sharpening aid apparatus 400 of FIG. 17. FIG. 24 is a bottom plan view of the adjustable angle cutting tool sharpening aid apparatus 400 of FIG. 17.

Referring to FIGS. 17-24, the adjustable angle cutting tool sharpening aid apparatus 400 includes a spirit level vial 402 in which a bubble 404 moves. The adjustable angle cutting tool sharpening aid apparatus 400 further includes a spirit level vial harness 406 and a spirit level vial harness 408, which are fixed to members 409a and 409b. The members

Figure 20:
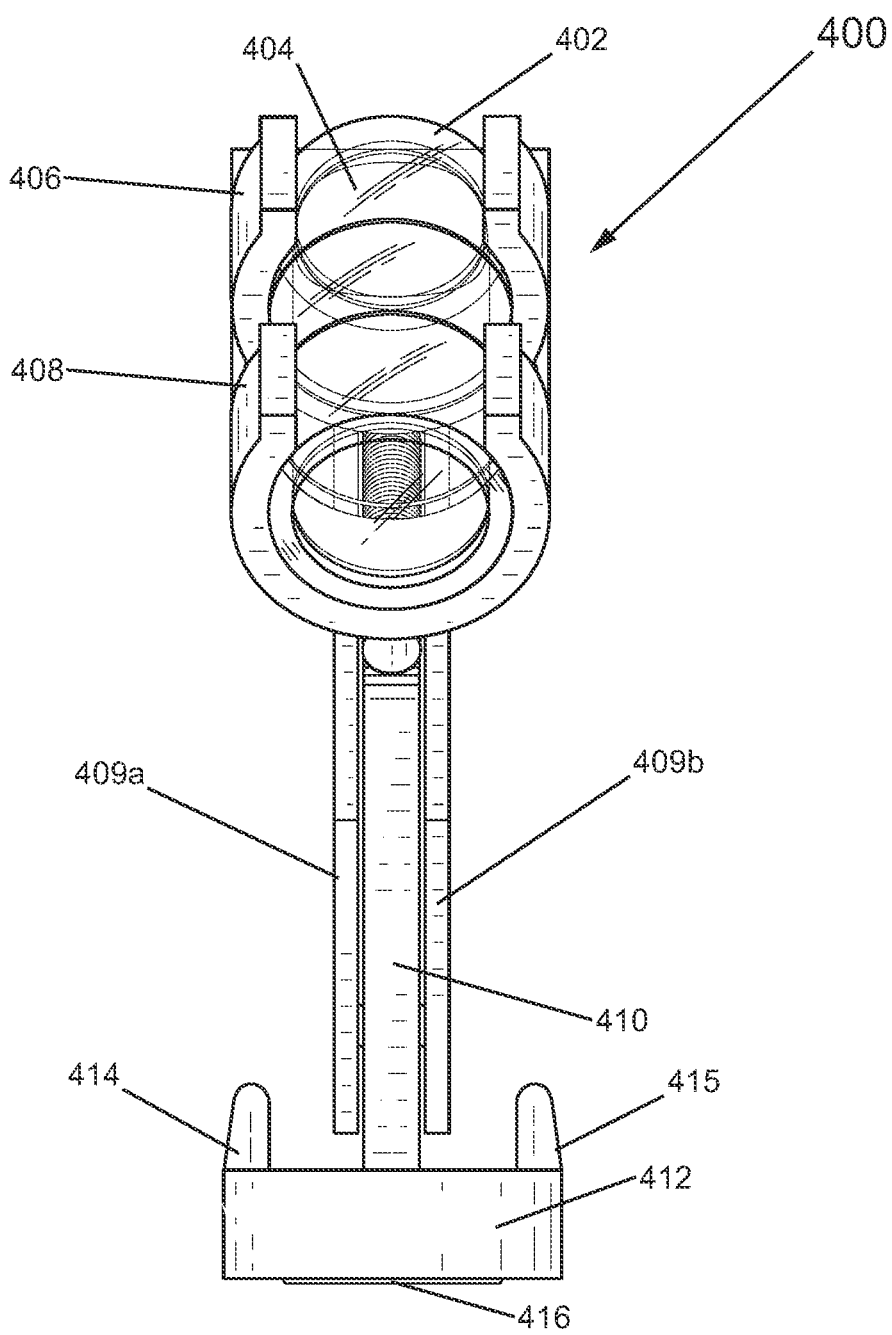
FIG. 20 is a rear elevational view of the adjustable angle cutting tool sharpening aid apparatus of FIG. 17.

409a and 409b are rotatably mounted through a pin to member or protrusion 410, wherein the member 410 sandwiched between the members 409a and 409b, as shown for example in FIG. 20.

The thumbscrew 403 and mating threads cut in the top of member 410 form a worm and worm gear mechanism for adjusting and securing the angle of the spirit level vial 402 relative to the surface of the base magnet 416. Turning the thumbscrew 403 in one direction or the other increases or decreases the angle of the spirit level vial 402 relative to the surface of the base magnet 416. The split index 417 with different values on each side of the apparatus 400 indicative of the angle of the spirit level vial 402 relative to the surface of the base magnet 416.

The member 410 is fixed to the base 412. The members 409a and 409b may be substantially or exactly triangular in shape. There are projections or protrusions 414 and 415 which extend from base 412, shown in FIG. 21, which a user provided elastic band hooks on to attach the apparatus 400 to a non-ferrous non-magnetic surface such as that of a cutting tool with a ceramic blade or a whetstone. A magnet 416 is fixed to the bottom of base 412. The magnet 416 is used to detachably attach the adjustable angle cutting tool sharpening aid apparatus 400 to the surface 104a of the blade 104 of the cutting tool 100 as shown in FIG. 17. The adjustable angle cutting tool sharpening aid apparatus 400 is attached in FIG. 17 to the surface 104a, and the surface 104a is at an angle with respect to the top surface 202 of the unpowered unguided sharpening implement 200, so that the surface 104a makes the angle as indicated by the index with respect to the surface 202 of the unpowered unguided sharpening implement 200. This is the desired angle to sharpen the edge 104c of the blade 104. The edge 104c is opposite a non sharp edge or spine 104b of the blade 104.

As shown in FIG. 21, the spirit level vial 402, in which the bubble 404 moves, is at an angle of A3 (the user desired sharpening angle) with respect to the surface of magnet 416 in base 412. Therefore, when attached to cutting tool side surface 104a (shown in dashed lines and parallel to line L3) the spirit level vial is at angle A3 relative to surface 104a. When the apparatus 400 is positioned on the surface 104a of the cutting tool blade 104 with the lower end of the spirit level vial 402 facing the spine 104b, raising the spine 104b of the cutting tool blade 104 until the bubble 404 is centered in the spirit level vial 402 puts the cutting tool at the user desired angle A3 relative to a level unpowered unguided sharpening implement 200 surface 202. At this point the manual repetitive sharpening motions can begin with the user simultaneously raising or lowering the spine 104b as needed to keep the bubble 404 centered in the spirit level vial 402 to maintain the desired sharpening angle.

In at least one embodiment, screw 403, such as a thumbscrew, shown in FIG. 18 may be turned in one direction or the other, in order to allow the orientation of the spirit level vial 402, to be adjusted with respect to the fixed member 410, and the base magnet 416 which results in adjusting the angle A3 shown in FIG. 21. The split index 417 with different values on each side of the apparatus 400 indicate the angle A3 of the spirit level vial 402 relative to the surface of the base magnet 416 and therefore to the surface 104a of the blade 104, when the apparatus 400 is attached to the blade 104 as in FIG. 17.

Figure 26:
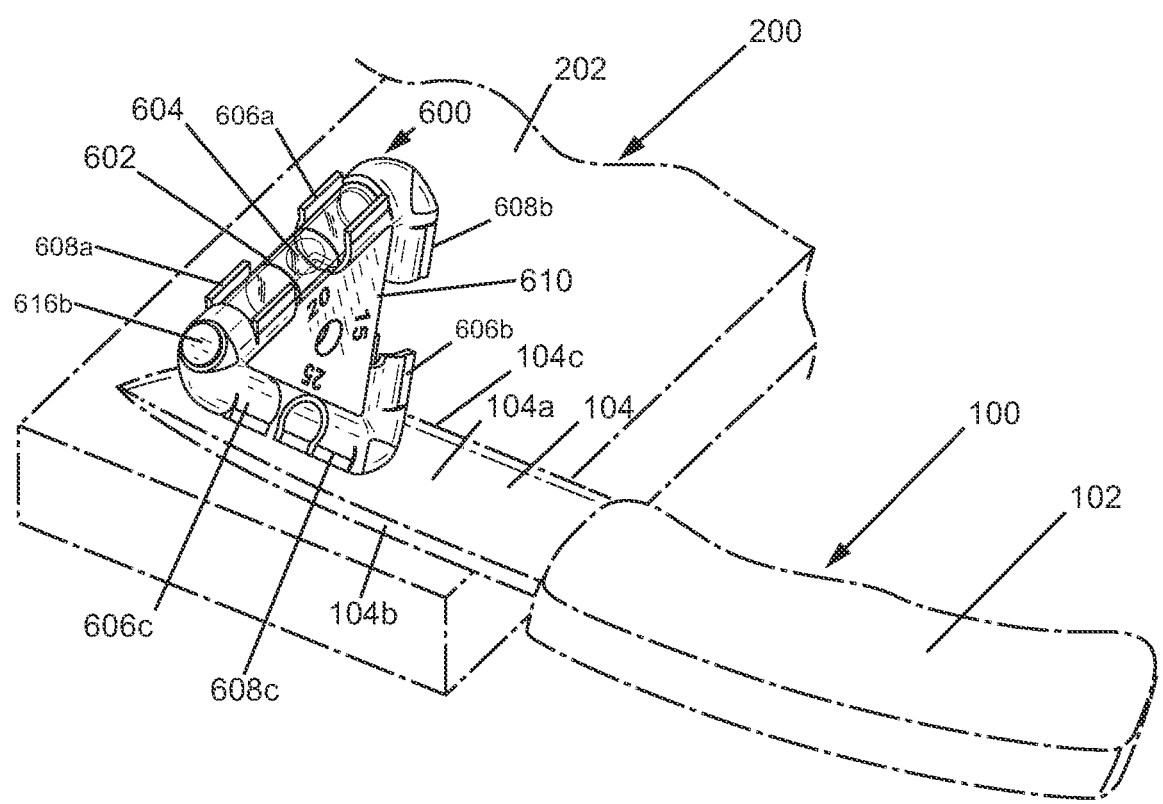
FIG. 26 is a rear, right, and top perspective view of a fixed angle cutting tool sharpening aid apparatus placed on a blade of a cutting tool in accordance with another embodiment of the present invention.
Figure 27:
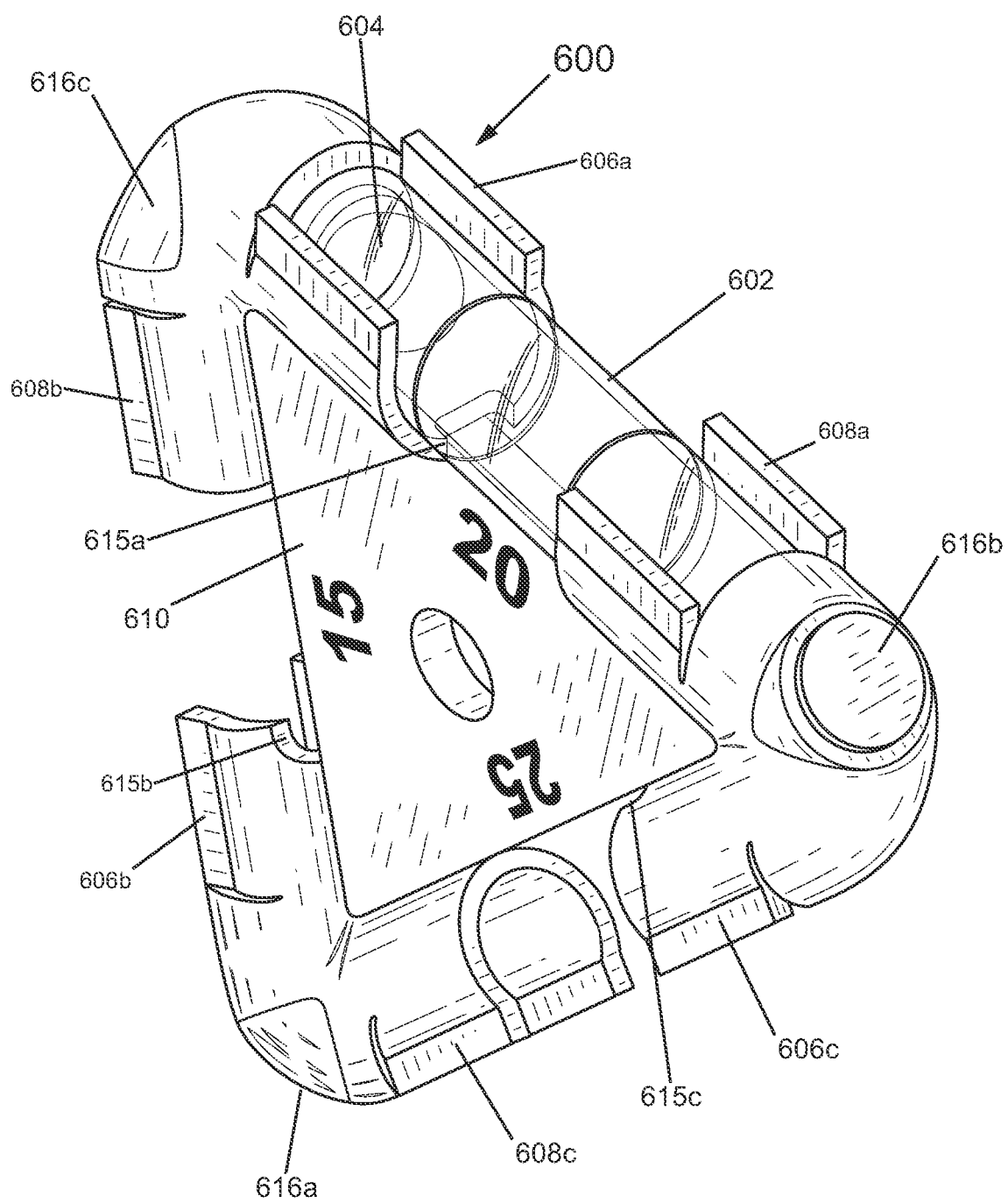
FIG. 27 is a rear, left, and top perspective view of the fixed angle cutting tool sharpening aid apparatus of FIG. 26.
Figure 28:
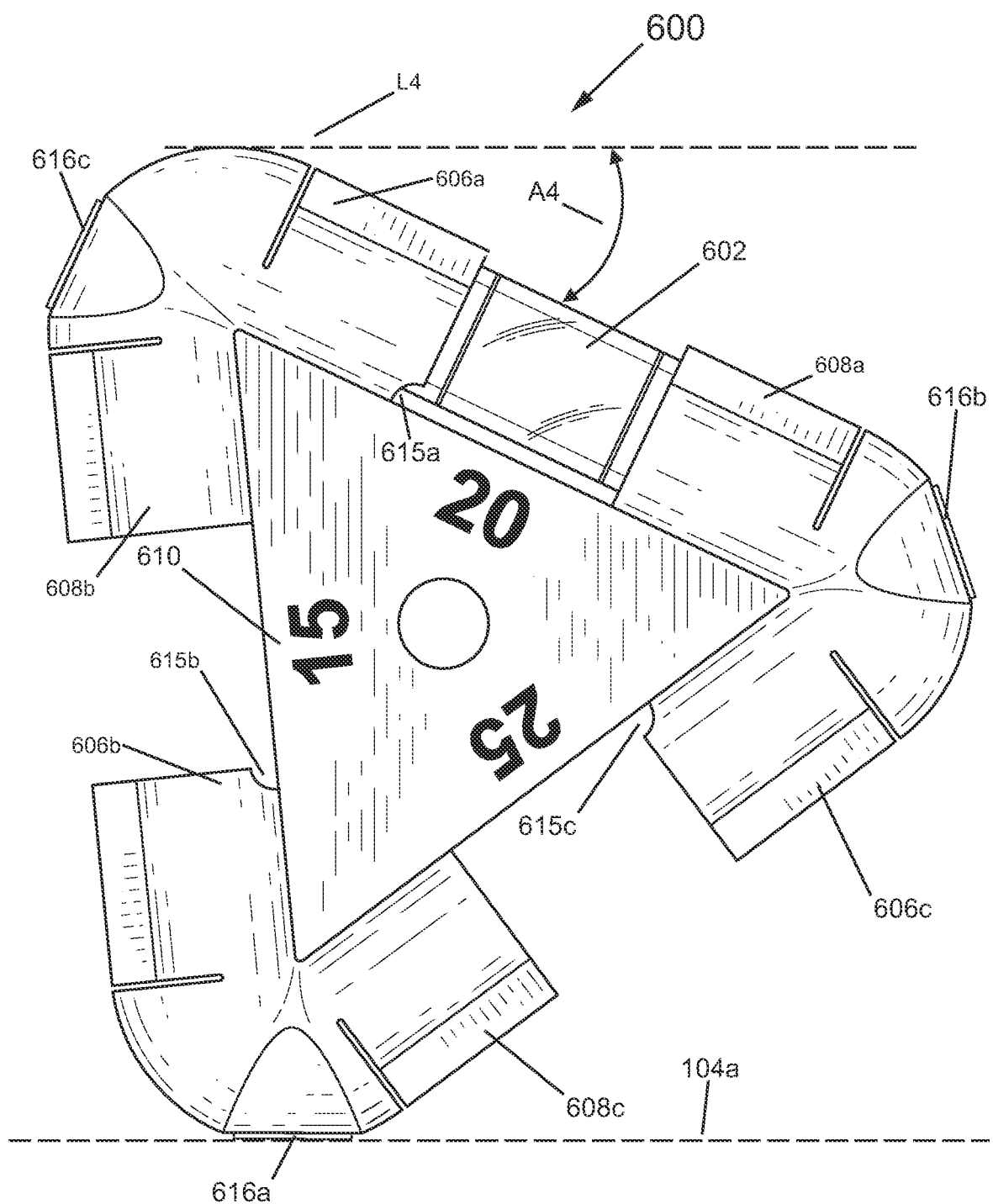
FIG. 28 is a left side elevational view of the fixed angle cutting tool sharpening aid apparatus of FIG. 26.
Figure 29:
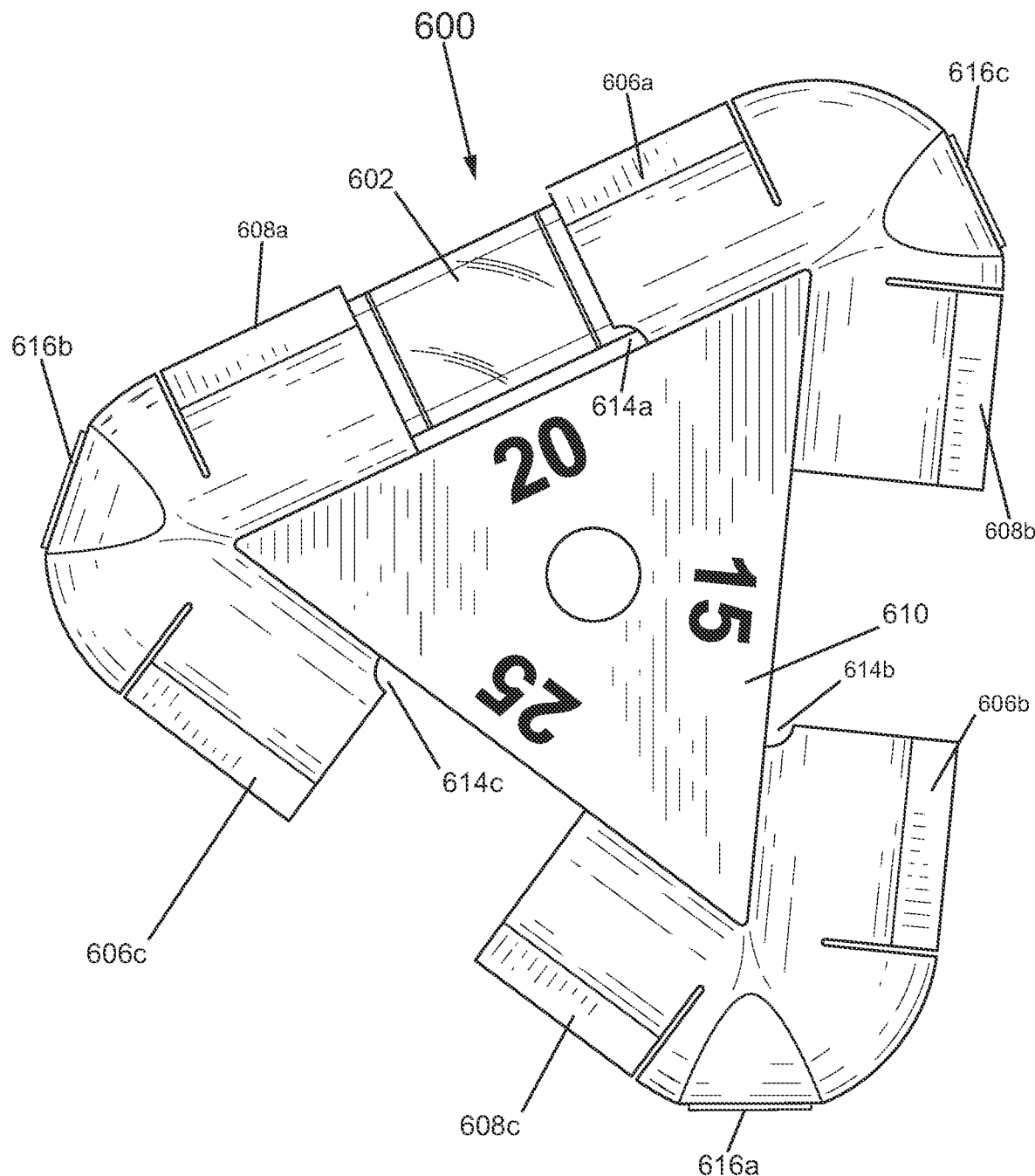
FIG. 29 is a right side elevational view of the fixed angle cutting tool sharpening aid apparatus of FIG. 26.
Figure 30:
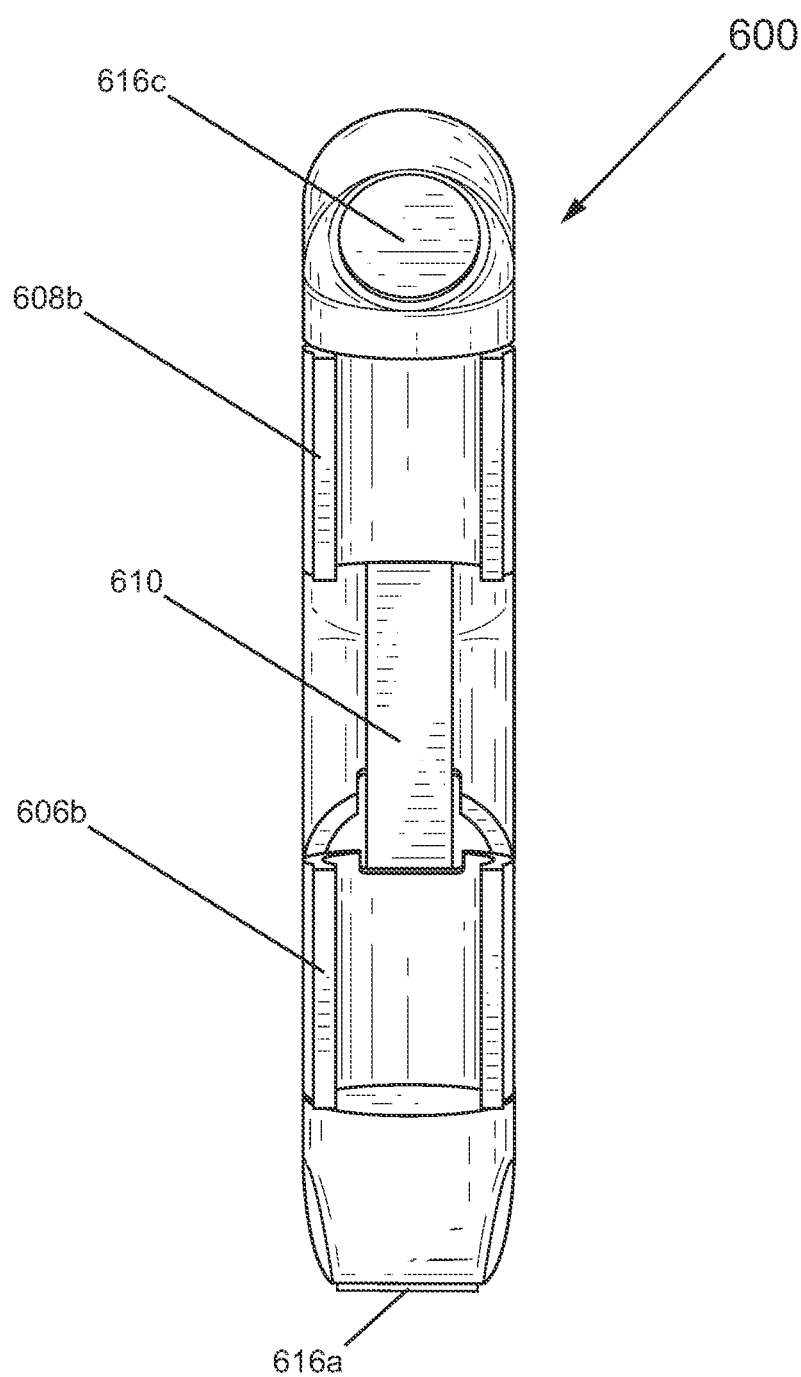
FIG. 30 is a front elevational view of the fixed angle cutting tool sharpening aid apparatus of FIG. 26.
Figure 31:
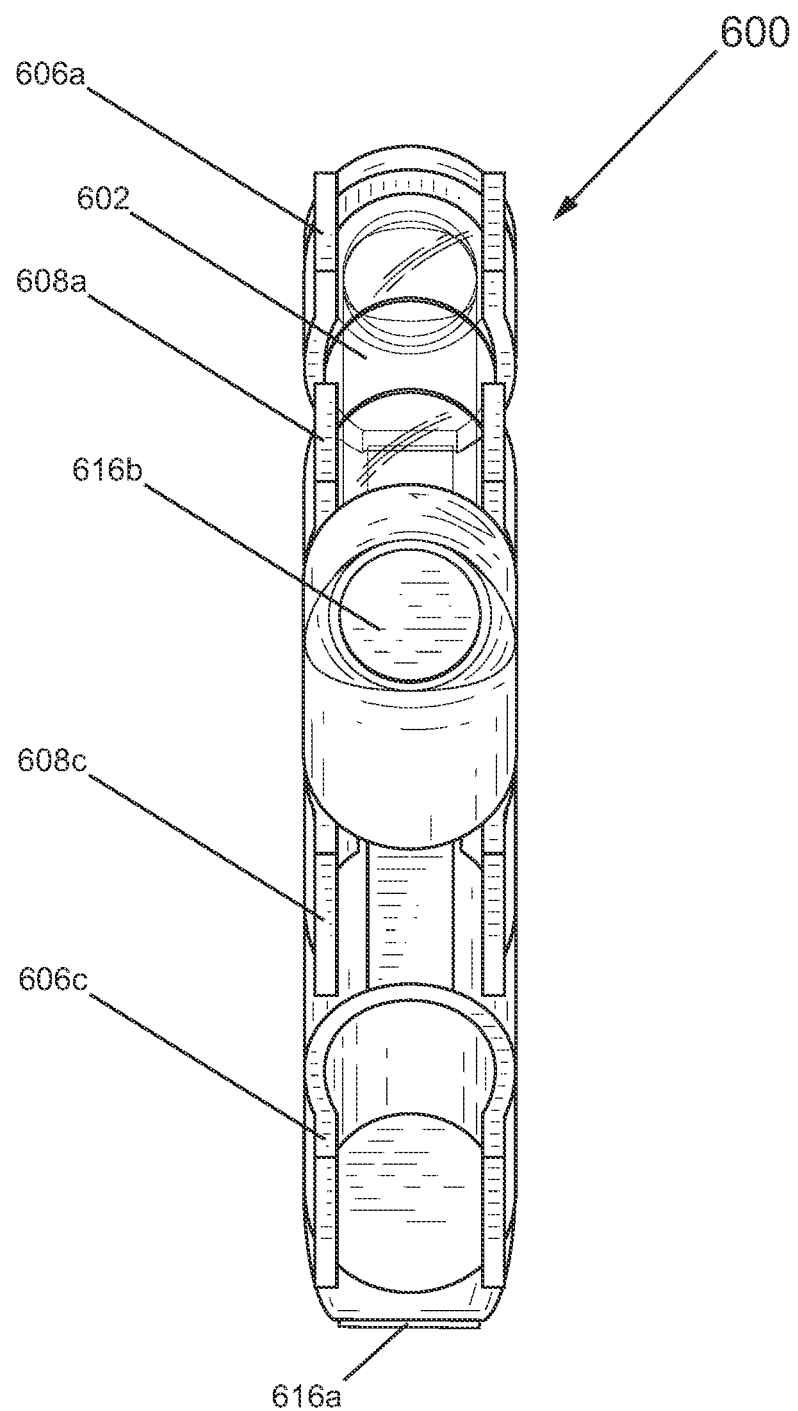
FIG. 31 is a rear elevational view of the fixed angle cutting tool sharpening aid apparatus of FIG. 26.
Figure 32:
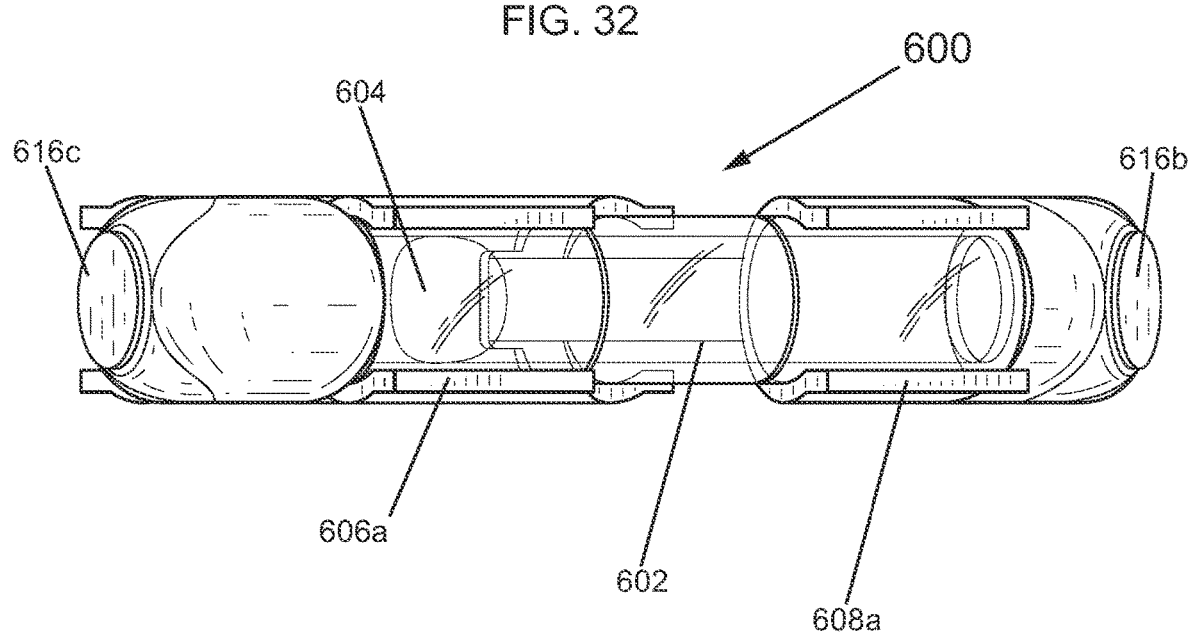
FIG. 32 is a top plan view of the fixed angle cutting tool sharpening aid apparatus of FIG. 26.
Figure 33:
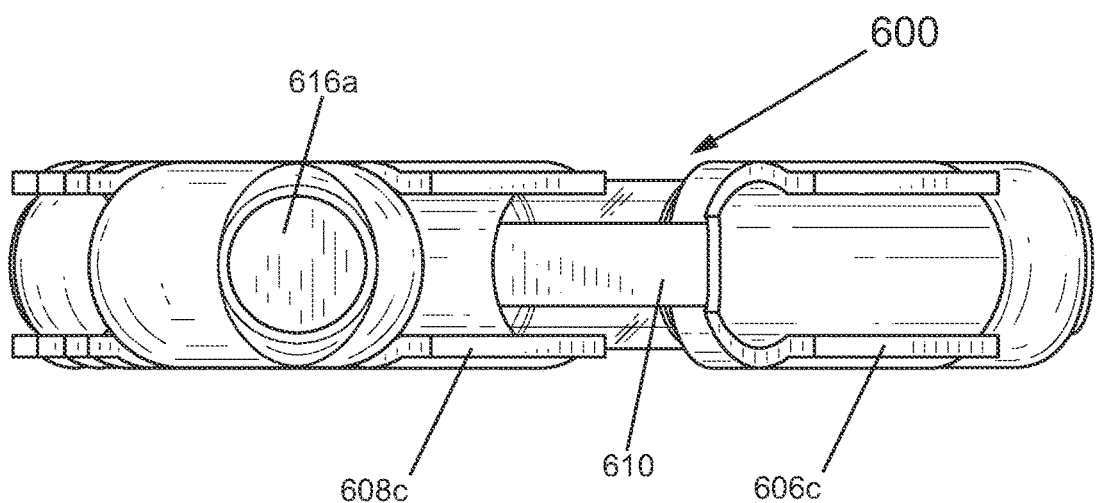
FIG. 33 is a bottom plan view of the fixed angle cutting tool sharpening aid apparatus of FIG. 26.

FIG. 26 is a rear, right, and top perspective view of a fixed angle cutting tool sharpening aid apparatus 600 placed on the blade 104 of the cutting tool 100 in accordance with another embodiment of the present invention. FIG. 27 is a rear, left, and top perspective view of the fixed angle cutting tool sharpening aid apparatus 600 of FIG. 26. FIG. 31 is a rear elevational view of the fixed angle cutting tool sharpening aid apparatus 600 of FIG. 26. FIG. 30 is a front elevational view of the fixed angle cutting tool sharpening aid apparatus 600 of FIG. 26. FIG. 29 is a right side elevational view of the fixed angle cutting tool sharpening aid apparatus 600 of FIG. 26. FIG. 28 is a left side elevational view of the fixed angle cutting tool sharpening aid apparatus 600 of FIG. 26. FIG. 32 is a top plan view of the fixed angle cutting tool sharpening aid apparatus 600 of FIG. 26. FIG. 33 is a bottom plan view of the fixed angle cutting tool sharpening aid apparatus 600 of FIG. 26.

Referring to FIGS. 26-33, The fixed angle cutting tool sharpening aid apparatus 600 includes a spirit level vial 602 in which a bubble 604 moves. The fixed angle cutting tool sharpening aid apparatus 600 includes magnetic members 616a, 616b, and 616c. The fixed angle cutting tool sharpening aid apparatus further includes a central member 610.

The fixed angle cutting tool sharpening aid apparatus 600 further includes three spirit level vial harness pairs: spirit level vial harnesses 606a and 608a; spirit level vial harnesses 606b and 608b; and spirit level vial harnesses 606c and 608c. The spirit level vial harnesses 606a-c and 608a-c are fixed to the central member 610. The central member 610 is preferably triangular in at least one embodiment. There are notches 614a-c and 615a-c in harnesses 606a-c as seen is FIGS. 28 and 29 which a user provided elastic band hooks on to attach the apparatus to non-ferrous non-magnetic surfaces such as that of a cutting tool with a ceramic blade or a whetstone. The spirit level vial 602 can be held either by spirit level vial harnesses 606a and 608a, as shown in FIG. 26, or similarly or identically by tube harnesses 606b and 608b or similarly or identically by spirit level vial harnesses 606c and 608c. This allows the fixed angle cutting tool sharpening aid apparatus 600 to provide three fixed sharpening angles such as fifteen (15.0) degrees, twenty (20.0) degrees and twenty-five (25.0) degrees.

When the spirit level vial 602 is held by spirit level vial harnesses 606a and 608a as shown in FIG. 28, the spirit level vial 602 is at an angle of twenty (20.0) degrees, with respect to surface 104a, when the magnetic member 616a is parallel and sits on a surface 104a, shown by a dashed line, which is parallel to the line L4. The number "20" is printed on the member 610, of the apparatus 600, substantially centered under a gap between harnesses 606a and 608a, so "20" can be read when the magnetic member 616a, is attached to the blade 104, and "20" on the member 610 is in an upright, readable state as shown in FIG. 26, when the blade 104 is at an angle of twenty (20.0) degrees for sharpening. The number "20 is closest to the gap between the harnesses 606a and 608a of the numbers "15", "20", and "25" printed on the member 610. The numbers "15", "20" and "25" are preferably printed on both sides of the member 610.

Similarly, or identically, when the spirit level vial 602 is held by spirit level vial harnesses 606b and 608b, the spirit level vial 602 is at an angle of fifteen (15.0) degrees, with respect to surface 104a, when the magnetic member 616b is parallel and sits on the surface 104a. The number "15" is printed on a member 610, of the apparatus 600, substantially centered under a gap between harnesses 606b and 608b, so "15" can be read when the magnetic member 616b, is attached to the blade 104, and "15" on the member 610 is in an upright, readable state, when the blade 104 is at an angle of fifteen (15.0) degrees for sharpening. The number "15" is closest to the gap between the harnesses 606b and 608b of the numbers "15", "20" and "25".

Similarly, or identically, when the spirit level vial 602 is held by spirit level vial harnesses 606c and 608c, the spirit level vial 602 is at an angle of twenty-five (25.0) degrees, with respect to surface 104a, when the magnetic member 616c is parallel and sits on the surface 104a. The number "25" is printed on a member 610, of the apparatus 600, substantially centered under a gap between harnesses 606c and 608c, so "25" can be read when the magnetic member 616c, is attached to the blade 104, and "25" on the member 610 is in an upright, readable state, when the blade 104 is at an angle of twenty-five (25.0) degrees for sharpening. The number "25" is closest to the gap between the harnesses 606c and 608c of the numbers "15", "20" and "25".

Each of the magnetic members 616a-c is used to detachably attach the fixed angle cutting tool sharpening aid apparatus 600 to the surface 104a of the blade 104 of the cutting tool 100, such as for magnetic member 616a, as shown in FIG. 26. The fixed angle cutting tool sharpening aid apparatus 600 is attached in FIG. 26 to the surface 104a, so that the surface 104a makes an angle of twenty (20.0) degrees with respect to the surface 202 of the unpowered unguided sharpening implement 200 when the spine 104b is raised until the bubble 604 is centered in the spirit level vial 602. In at least one embodiment, twenty (20.0) degrees may be considered to be a common angle to sharpen the edge 104c of the blade 104. The edge 104c is opposite the non sharp edge or spine 104b of the blade 104.

As shown in FIG. 28, the spirit level vial 602, in which the bubble 604 moves, is at an angle of A4 (the user desired sharpening angle) with respect to the surface of magnet 616a. Therefore, when attached to cutting tool side surface 104a (shown in dashed lines and parallel to line L4) the spirit level vial 602 is at angle A4 relative to surface 104a. When the apparatus 600 is positioned on the surface 104a of the cutting tool blade 104 with the lower end of the spirit level vial 602 facing the spine 104b, raising the spine 104b of the cutting tool blade 104 until the bubble 604 is centered in the spirit level vial 602 puts the cutting tool at the user desired angle A4 relative to a level unpowered unguided sharpening implement 200 surface 202. At this point the manual repetitive sharpening motions can begin with the user simultaneously raising or lowering the spine 104b as needed to keep the bubble 604 centered in the spirit level vial 602 to maintain the desired sharpening angle.

It may be determined that one of the other two angles such as fifteen (15) degrees or twenty-five (25.0) degrees is more desirable. In one or more embodiments, the spirit level vial 602 may be attached to harness pair 606b and 608b (for fifteen (15.0) degrees) or harness pair 606c and 608c (for twenty-five (25.0) degrees), depending on what is desired by the user or for the particular purpose.

Figure 34:
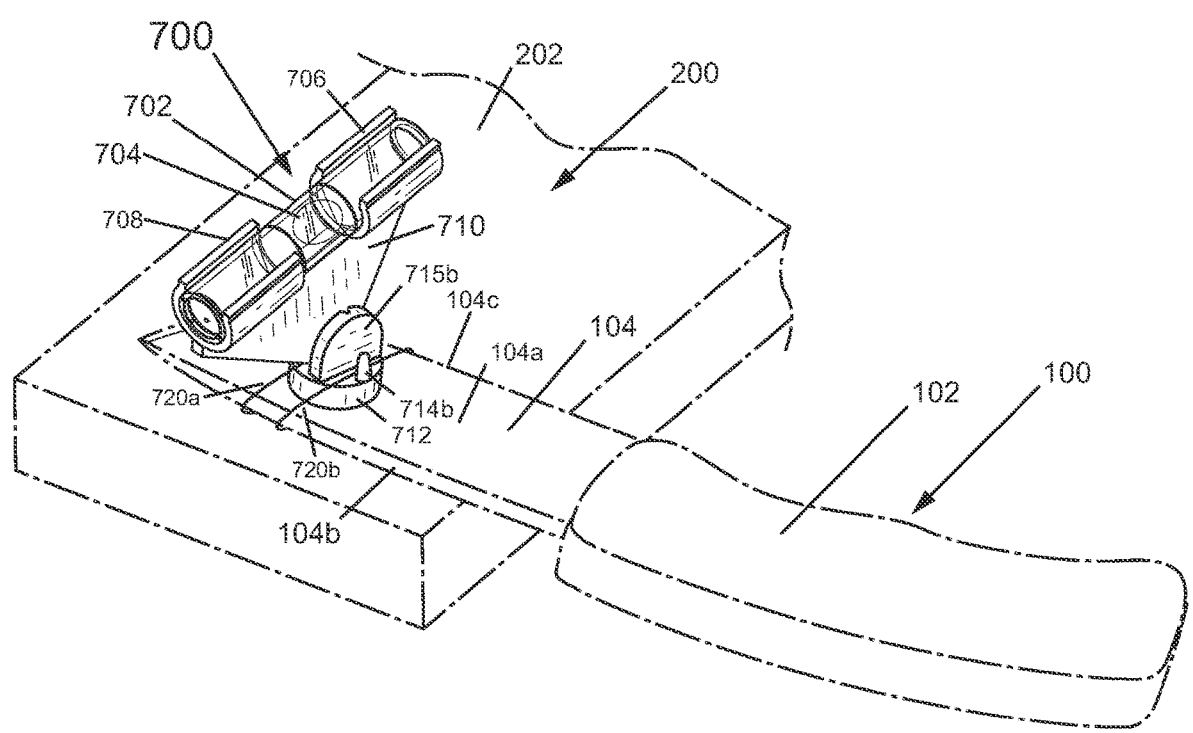
FIG. 34 is a rear, right, and top perspective view of a fixed angle cutting tool sharpening aid apparatus 700 placed on a blade of a cutting tool in accordance with another embodiment of the present invention.
Figure 35:
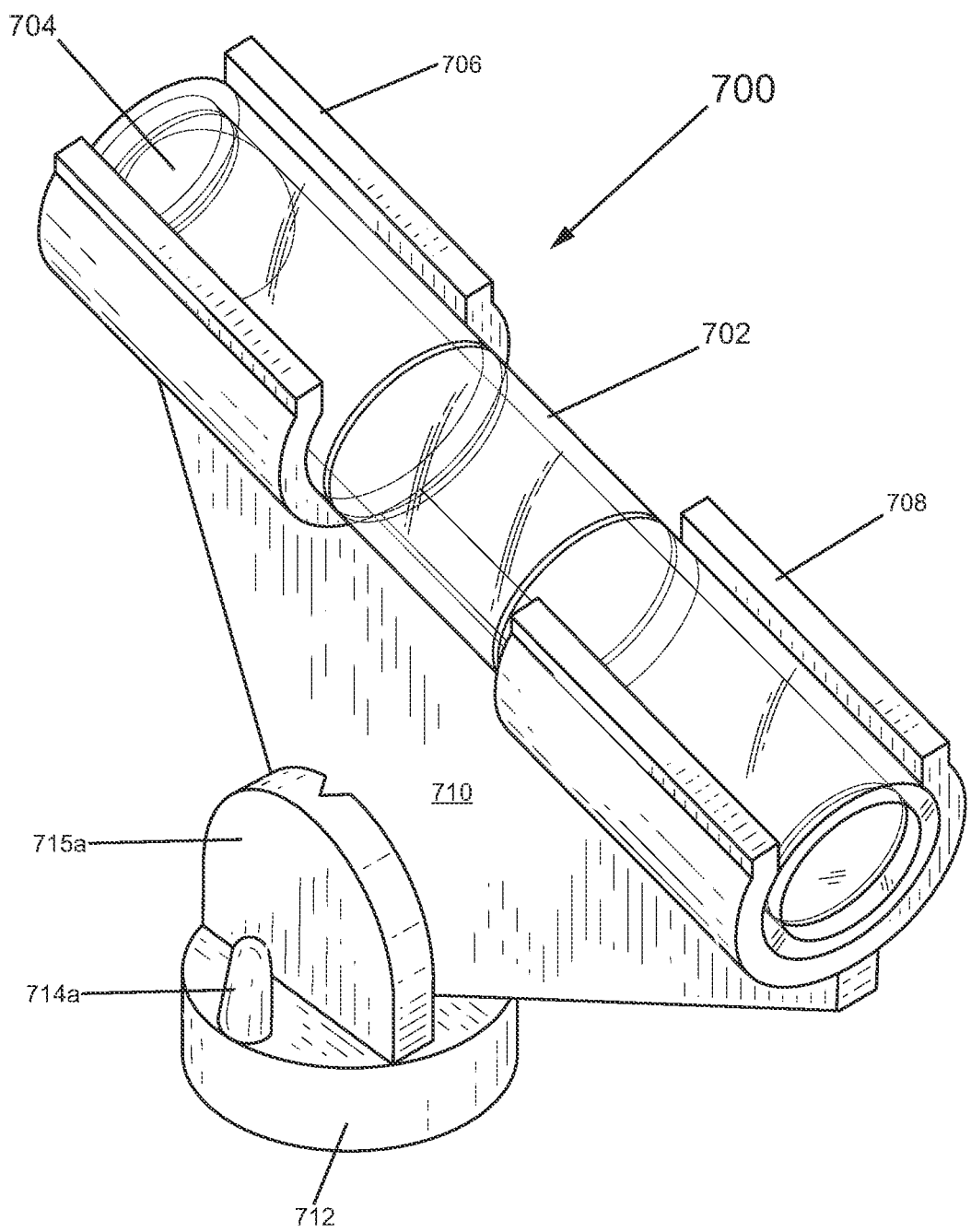
FIG. 35 is a rear, left, and top perspective view of the fixed angle cutting tool sharpening aid apparatus of FIG. 34.
Figure 36:
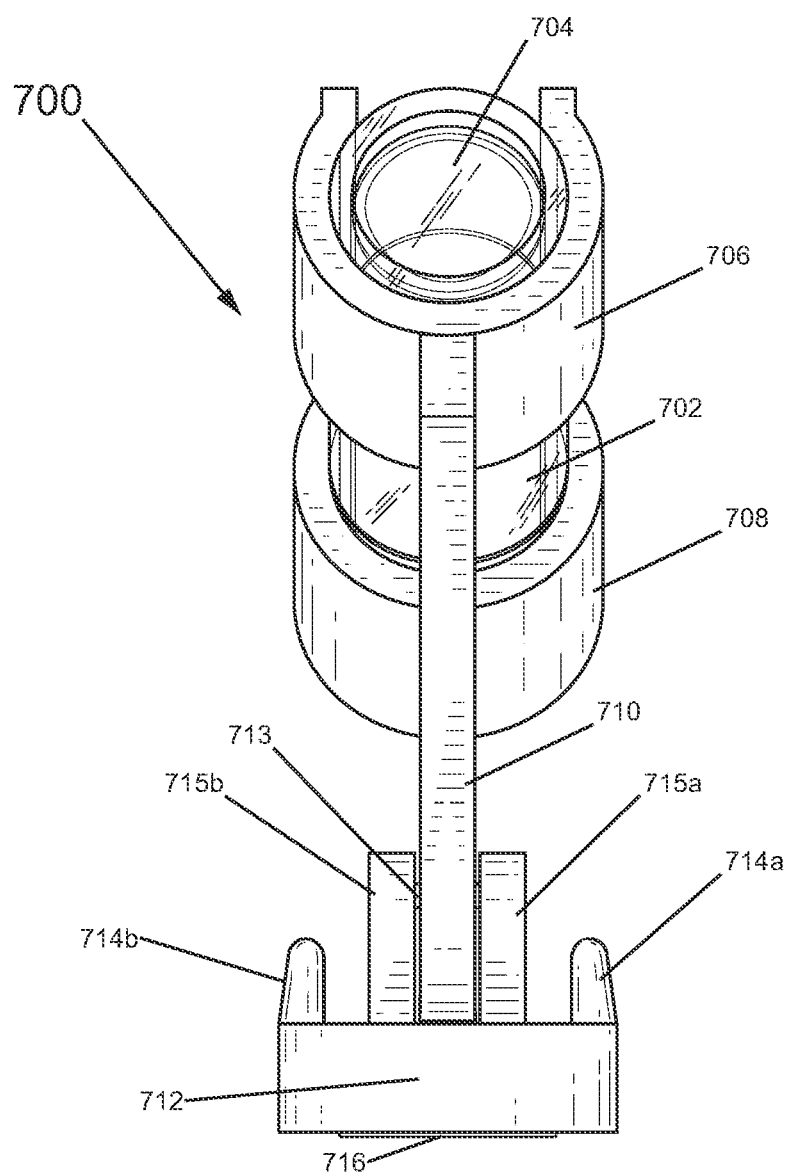
FIG. 36 is a front elevational view of the fixed angle cutting tool sharpening aid apparatus of FIG. 34.
Figure 37:
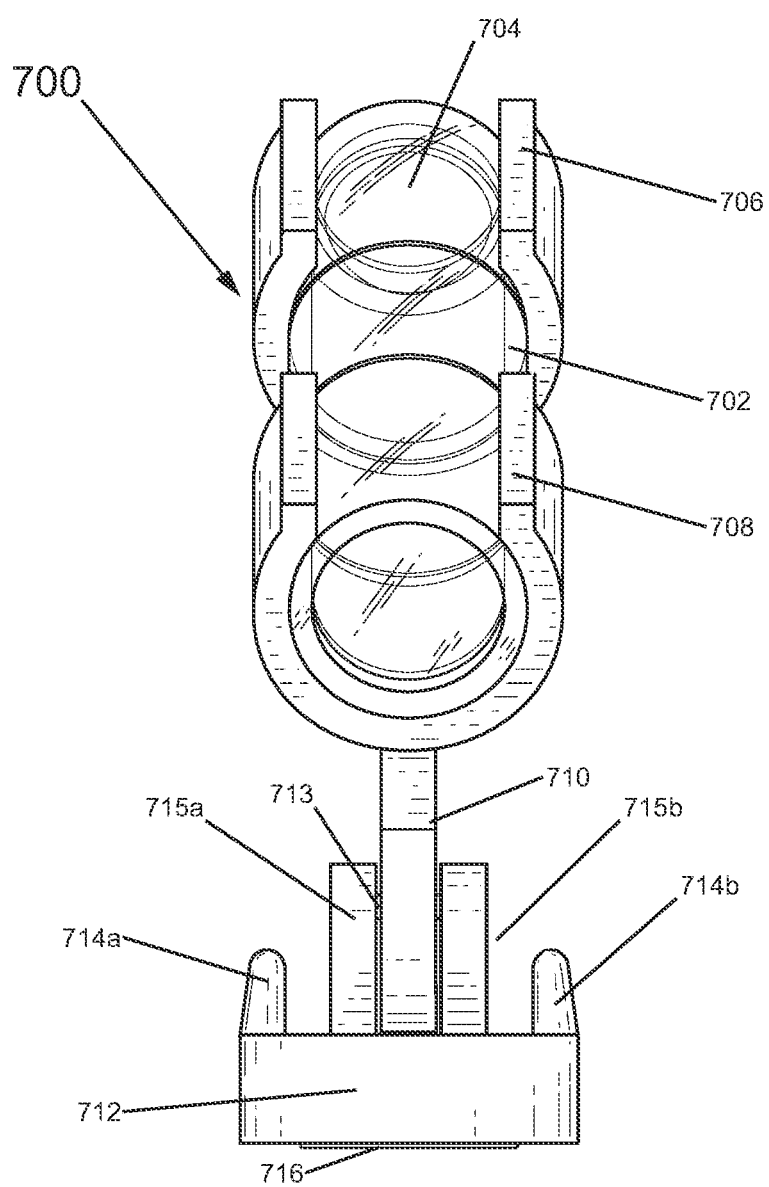
FIG. 37 is a rear elevational view of the fixed angle cutting tool sharpening aid apparatus of FIG. 34.
Figure 38:
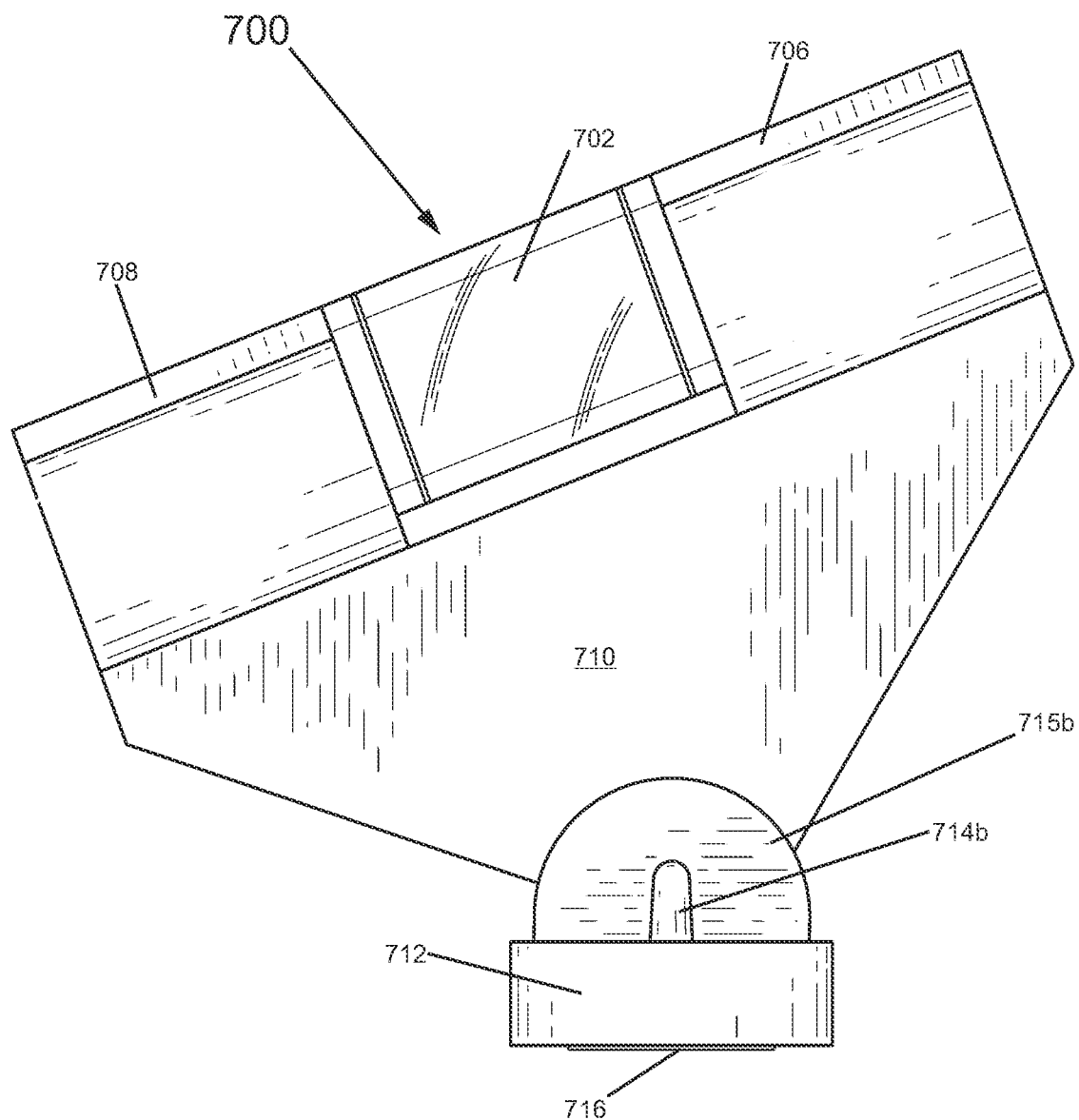
FIG. 38 is a right side elevational view of the fixed angle cutting tool sharpening aid apparatus of FIG. 34.
Figure 39:
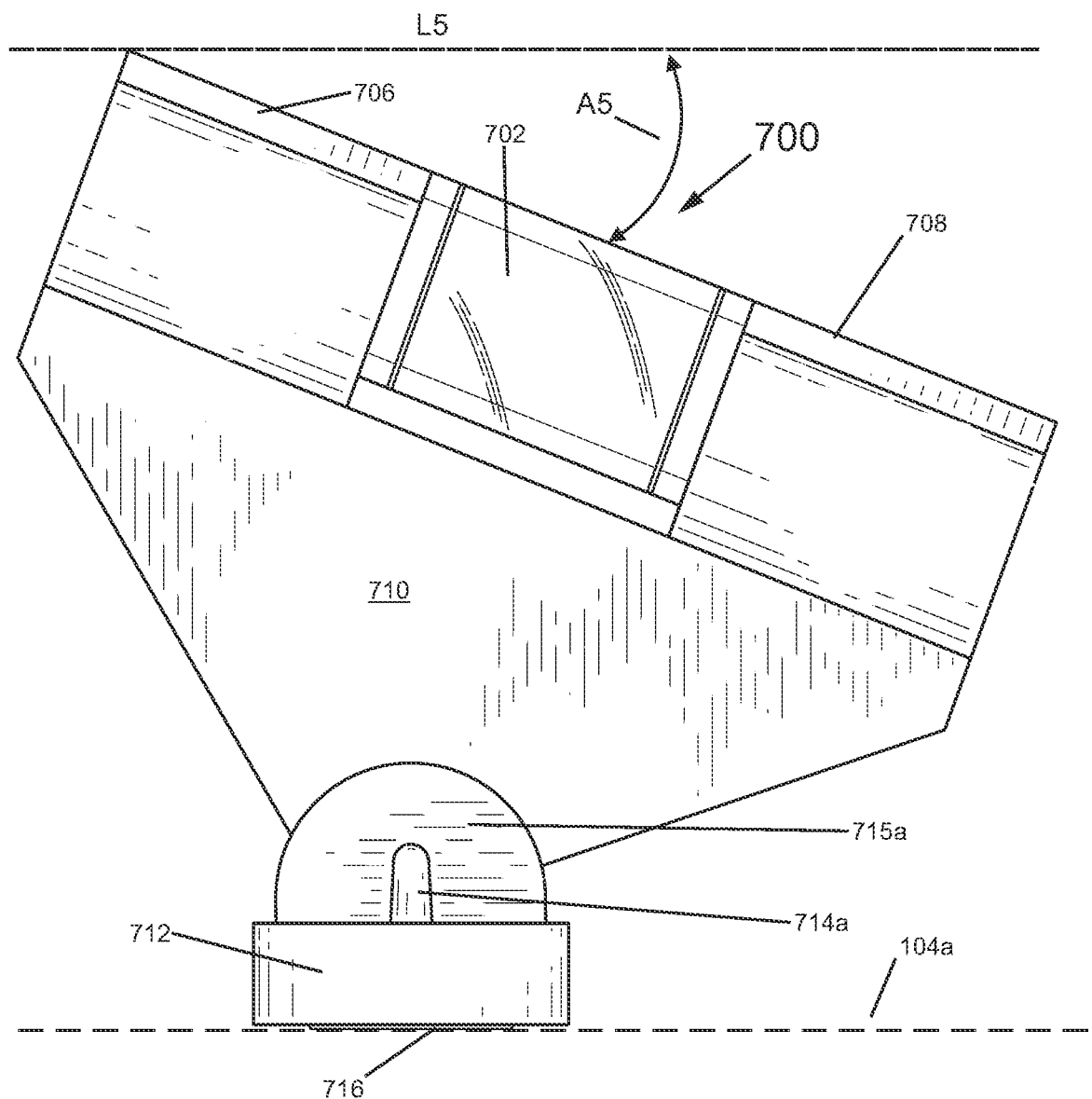
FIG. 39 is a left side elevational view of the fixed angle cutting tool sharpening aid apparatus of FIG. 34.
Figure 40:
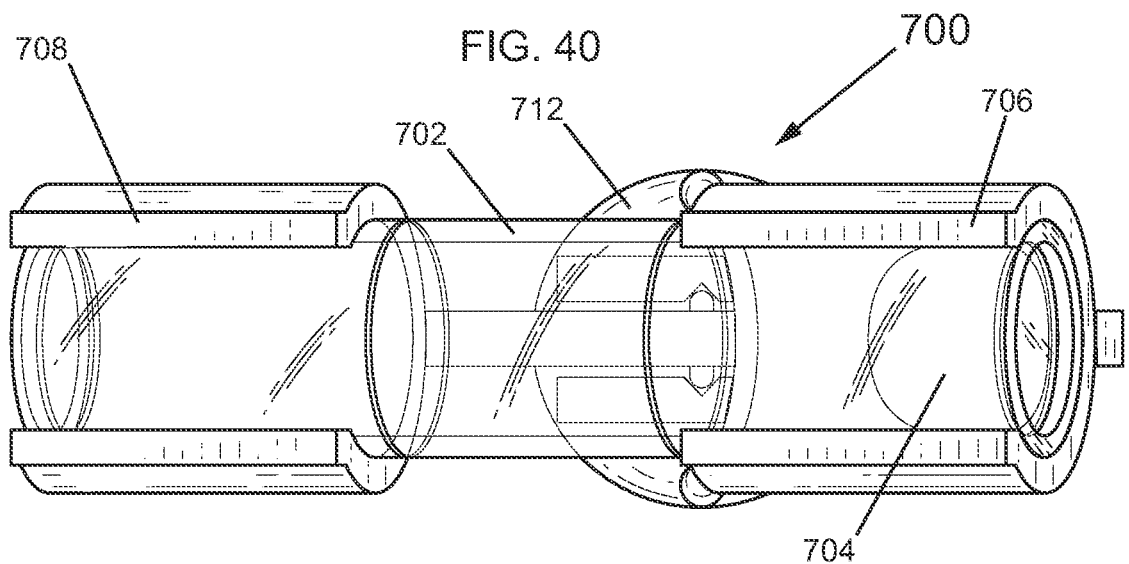
FIG. 40 is a top plan view of the fixed angle cutting tool sharpening aid apparatus of FIG. 34.
Figure 41:
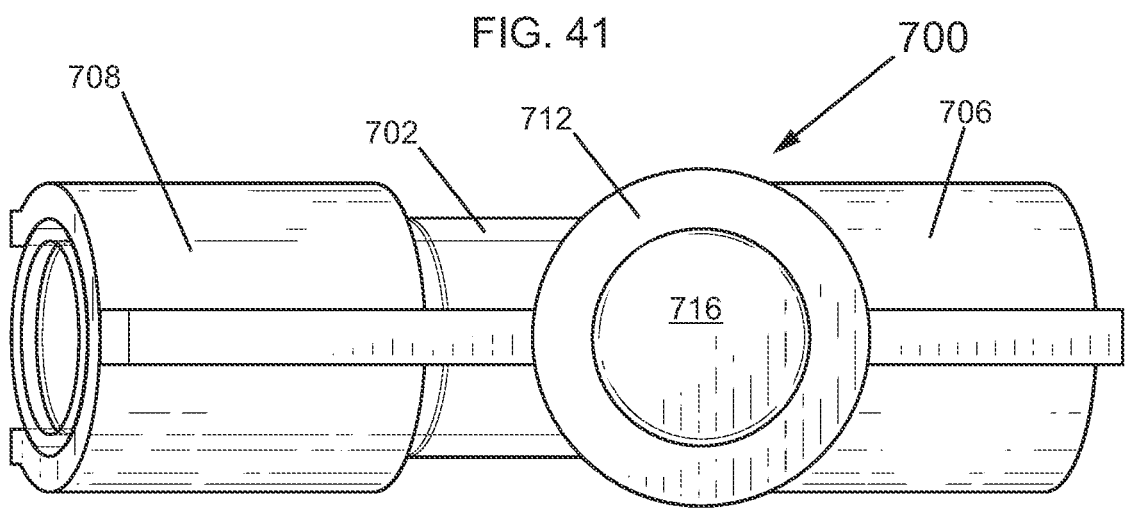
FIG. 41 is a bottom plan view of the fixed angle cutting tool sharpening aid apparatus of FIG. 34.

FIG. 34 is a rear, right, and top perspective view of a fixed angle cutting tool sharpening aid apparatus 700 placed on the blade 104 of the cutting tool 100 in accordance with another embodiment of the present invention. FIG. 35 is a rear, left, and top perspective view of the fixed angle cutting tool sharpening aid apparatus 700 of FIG. 34. FIG. 38 is a right side elevational view of the fixed angle cutting tool sharpening aid apparatus 700 of FIG. 34. FIG. 39 is a left side elevational view of the fixed angle cutting tool sharpening aid apparatus 700 of FIG. 34. FIG. 36 is a front elevational view of the fixed angle cutting tool sharpening aid apparatus 700 of FIG. 34. FIG. 37 is a rear elevational view of the fixed angle cutting tool sharpening aid apparatus 700 of FIG. 34. FIG. 40 is a top plan view of the fixed angle cutting tool sharpening aid apparatus 700 of FIG. 34. FIG. 41 is a bottom plan view of the fixed angle cutting tool sharpening aid apparatus 700 of FIG. 34.

Referring to FIGS. 34-41, the fixed angle cutting tool sharpening aid apparatus 700 includes a spirit level vial 702, a bubble 704, a harness 706, a harness 708, a member 710, a base 712, a pivot pin 713 (partially shown in FIG. 36), a member 714a, a member 714b, a member 715a, a member 715b, and a magnetic member or section 716 attached to a bottom of the base 712 (shown in FIG. 36).

The harnesses 706 and 708 are fixed to the member 710. The member 710 is pivotally or rotationally mounted by pivot pin 713 to the members 715a and 715b. The members 715a and 715b are fixed to and protrude from the base 712.

In at least one embodiment, the member 710 can be rotated with respect to the members 715a and 715b, to thereby adjust the angle A5, shown in FIG. 39, of the spirit level vial 702 with respect to the surface of base magnet 716, the surface 104a, and a parallel line L5. This allows this embodiment to be set within a range of common sharpening angles and then fixed in place with adhesive during a manufacturing or assembly operation thereby creating a fixed angle cutting tool sharpening angle aid apparatus 700.

As shown in FIG. 39, the spirit level vial 702, in which the bubble 704 moves, is at an angle of A5 (the user desired sharpening angle) with respect to the surface of magnet 316 in base 312. Therefore, when attached to cutting tool side surface 104a (shown in dashed lines and parallel to line L5) the spirit level vial 702 is at angle A5 relative to surface 104a. When the apparatus 700 is positioned on the surface 104a of the cutting tool blade 104 with the lower end of the spirit level vial 702 facing the spine 104b, raising the spine 104b of the cutting tool blade 104 until the bubble 704 is centered in the spirit level vial 702 puts the cutting tool at the user desired angle A5 relative to a level unpowered unguided sharpening implement 200 surface 202. At this point the manual repetitive sharpening motions can begin with the user simultaneously raising or lowering the spine 104b as needed to keep the bubble 704 centered in the spirit level vial 702 to maintain the desired sharpening angle.

One or more embodiments of the present invention provide an innovative new type of cutting tool sharpening angle aid, such as one or more of apparatus 1 (FIGS. 1-8), apparatus 300 (FIGS. 9-16), apparatus 400 (FIGS. 17-24), apparatus 600 (FIGS. 26-33), apparatus 700 (FIGS. 34-41).

One or more of apparatuses 1, 300, 400, 600, and/or 700 are used with unpowered unguided sharpening implements such as whetstones 200 (water stones, oil stones, diamond stones), shown in FIG. 1, and/or files during periodic maintenance sharpening of existing cutting tools such as knives, chisels, axes, shears, wood plane irons, etc.

One or more of the apparatuses 1, 300, 400, 600, and/or 700 attaches to the article being hand-held and manually moved during the periodic maintenance sharpening operation. This could be attachment to either, the cutting tool when the cutting tool is relatively small, such as a knife, chisel, wood plane iron, etc. and sharpening against a stationary unpowered unguided sharpening implement such as a whetstone and/or the unpowered unguided sharpening implement such as a whetstone 200 and/or a file when moving these sharpening implements against a relatively large cutting tool such as an axe which is clamped stationary. Attachment to a non-ferrous non-magnetic surface such as that of a whetstone or cutting tool with a ceramic blade is via integral hooks 14 and 15, 314 and 315, 414 and 415, 614a-c and 615a-c, 714a and 714b, and a user provided elastic band or bands.

For example, the apparatus 1 may be attached and/or further secured to the blade 104 by elastic and/or rubber bands 20a and 20b as shown in FIG. 1. Band 20a may be in the form of a loop and/or closed curve which goes between member or protrusion 14 and member 10 and then loops about the blade 104. Similarly, band 20b may be in the form of a loop and/or closed curved which goes between member or protrusion 15 and member 10 and then loops about the blade 104.

Similarly or identically, the apparatus 300 may be attached and/or further secured to the blade 104 by elastic and/or rubber bands 320a and 320b as shown in FIG. 9. Band 320a may be in the form of a loop and/or closed curve which goes between member or protrusion 314 and member 309a and then loops about the blade 104. Similarly, band 320b may be in the form of a loop and/or closed curved which goes between member or protrusion 315 and member 309b and then loops about the blade 104.

Similarly or identically, the apparatus 400 may be attached and/or further secured to the blade 104 by elastic and/or rubber bands 420a and 420b as shown in FIG. 17. Band 420a may be in the form of a loop and/or closed curve which goes between member or protrusion 414 and member 409a and then loops about the blade 104. Similarly, band 420b may be in the form of a loop and/or closed curved which goes between member or protrusion 415 and member 409b and then loops about the blade 104.

Similarly or identically, the apparatus 700 may be attached and/or further secured to the blade 104 by elastic and/or rubber bands 720a and 720b as shown in FIG. 34. Band 720a may be in the form of a loop and/or closed curve which goes between member or protrusion 714a and member 715a and then loops about the blade 104. Similarly, band 720b may be in the form of a loop and/or closed curved which goes between member or protrusion 714b and member 715b and then loops about the blade 104.

Although the apparatuses 1, 300, 400, 600, and 700 are shown attached around the midpoint of the blade 104, in at least one embodiment it is preferred that the apparatuses 1, 300, 400, 600, and 700 be attached close to the handle 102 when bands such as one or more of bands 320a-b, 420a-b, and/or 720a-b are used. This prevents or substantially prevents the bands 320a-b, 420a-b, and/or 720a-b getting in the way of sharpening the edge 104c of the cutting tool. The edge 104c may not extend all the way to the handle 102 along the blade 104, but rather there may be a blunt or non sharp edge as part of the blade 104 near the handle 102, which may be convenient for attaching one or more of bands 20a-b, 320a-b, 420a-b, and/or 720a-b.

In one or more embodiments of the present invention, a spirit level vial 2, 302, 402, 602, and/or 702 with a relatively small diameter (generally less than 8 mm) and/or filled with a higher than typical viscosity liquid is utilized and preferred in an least one embodiment of the present invention as this makes the indicating bubble, such as 4, 304, 404, 604, and/or 704 less sensitive to the acceleration and deceleration of the repetitive sharpening motion and movement of the cutting tool 100 against the stationary unpowered unguided sharpening implement or the unpowered unguided sharpening implement against the stationary cutting tool, while continuing to accurately indicate how the user is holding the desired sharpening angle.

One or more of the apparatuses 1, 300, 400, 600, and/or 700 helps the user to maintain the desired sharpening angle of, the cutting tool 100 blade 104 relative to the stationary unpowered unguided sharpening implement or the unpowered unguided sharpening implement relative to the stationary cutting tool blade, throughout the entire repetitive manual sharpening motion and movement.

One or more of the apparatuses 1, 300, 400, 600, and/or 700 provides clear and constant visual feedback as to how the user is holding the desired sharpening angle so minor angle corrections can be made at any point in the entire repetitive manual sharpening motion.

One or more of the apparatuses 1, 300, 400, 600, and/or 700 can be used with, and does not interfere with, most any manual sharpening motions or techniques.

One or more of the apparatuses 1, 300, 400, 600, and/or 700 works with most any type and size of common cutting tools such as knives, chisels, axes, wood plane irons, shears, etc. and unpowered unguided sharpening implements such as whetstones and files.

One or more of the apparatuses 1, 300, 400, 600, and/or 700 help a user to develop improved manual sharpening technique by immediately identifying where in the repetitive manual sharpening motion an angle change occurs such that they can become familiar with where their technique needs correction.

The fixed angle apparatuses 1, 600 & 700 may be sold with additional similar fixed angle apparatuses, with the only difference being the angles A1, A4 and A5 respectively. For example, a set of fixed angle apparatuses may be provided similar or identical to that shown in FIGS. 1-8, 26-33 and 34-41 except for a difference in angle A1, A4 and A5 respectively such as one with a seventeen (17.0) degree angle for angle A1, A4 and A5, one with a twenty (20.0) degree angle for angle A1, A4 and A5 and one with a twenty-three (23.0) degree angle for angle A1 A4 and A5. A single spirit level vial 2, 602, 702 may be provided with a set of different apparatuses 1, 600 and 700, and then the single spirit level vial 2, 602, and 702 may be snapped into the appropriately angled apparatus to provide the appropriate angle A1, A4 and A5 for the desired sharpening angle.

In one or more embodiments, the spirit level vial harnesses 6 and 8, 306 and 308, 406 and 408, 606a-c and 608a-c, 706 and 708 permit the apparatuses 1, 300, 400, 600, and/or 700 to stand upside down (magnetic base 16, 316, 416, 616a-c, and/or 716 up) on the unpowered unguided sharpening implement 200 or the cutting tool blade (as in the case of a large cutting tool) to verify that the one which will remain stationary is level. This is required, in one or more embodiments, since the indicated sharpening angle is relative to a level unpowered unguided sharpening implement or a level cutting tool blade.

The spirit level vial harnesses 6 and 8, 306 and 308, 406 and 408, 606a-c and 608a-c, 706 and 708 permit the easy snap in and snap out of the spirit level vial 2, 302, 402, 602, and 702, such that the spirit level vial 2, 302, 402, 602, and/or 702 is configured to be moved from one fixed angle unit to another, and/or be removed to be cleaned or replaced.

In at least one embodiment, the entire spirit level vial 3, 302, 402, 602, and/or 702 is visible from the top, as shown in FIG. 7, FIG. 15, FIG. 23, FIG. 32, and/or FIG. 40, respectively, providing clear and continuous visual feedback on how the user is holding the desired sharpening angle throughout the entire repetitive manual sharpening motion. There are also viewing windows from the side permitting a view of the level indication when standing the present invention upside down on, the stationary unpowered unguided sharpening implement, such as whetstone 200, or a stationary large cutting tool blade, to level it.

Integral hooks 14 and 15, 314 and 315, 414 and 415, 614a-c and 615a-c, 714a and 714b permit one or more embodiments of the present invention to be attached, with a user provided elastic band, to non-ferrous non-magnetic surfaces such as that of a ceramic knife blade or a typical whetstone.

The apparatuses 1, 300, 400, 602, and/or 702 are miniaturized, in at least one embodiment, to attach to even the smallest of common cutting tools without impeding manual sharpening motions and therefore compatible with most all manual sharpening techniques and motions such as back and forth, slicing, sawing, circular or combinations of two or more.

Light weight and low center of gravity with a super magnet (neodymium magnet) 16, 316, 416, 616*a-c*, and/or 716 in the base is preferrable and critical, in at least one embodiment, to not topple the apparatuses 1, 300, 400, 600, and/or 700 when one or more are attached to, the cutting tool 100 or unpowered unguided sharpening implement, being hand held and manually moved.

Adjustable embodiments, such as in FIGS. 9-16 and FIGS. 17-24, incorporate a split index 317 and 417 providing one set of values on one side of the apparatus and another set of values on the other side of the apparatus. This increases the distance between the index lines improving the user ability to see minute (very small) angle adjustments and set points clearly. This eliminates the need for any type of wedge or calibration plate with a known angle to accurately set the desired sharpening angle.

The adjustable embodiment of FIGS. 17-24 incorporates a worm gear mechanism which permits smooth, precise, and secure adjustments in the sharpening angle without the need to reclamp the pivoting element which could inadvertently change the angle.

The fixed angle embodiment of FIGS. 26-33 is configured to provide three (3) different fixed sharpening angles in a single apparatus by moving the spirit level vial from one set of spirit level vial harnesses to another.

In at least one embodiment, water-proof and oil-proof construction is preferred and critical for one or more of apparatuses 1, 300, 400, 600 and/or 700 to withstand the usual lubricating fluids used with unpowered unguided sharpening implements such as whetstones and files.

Figure 25B:
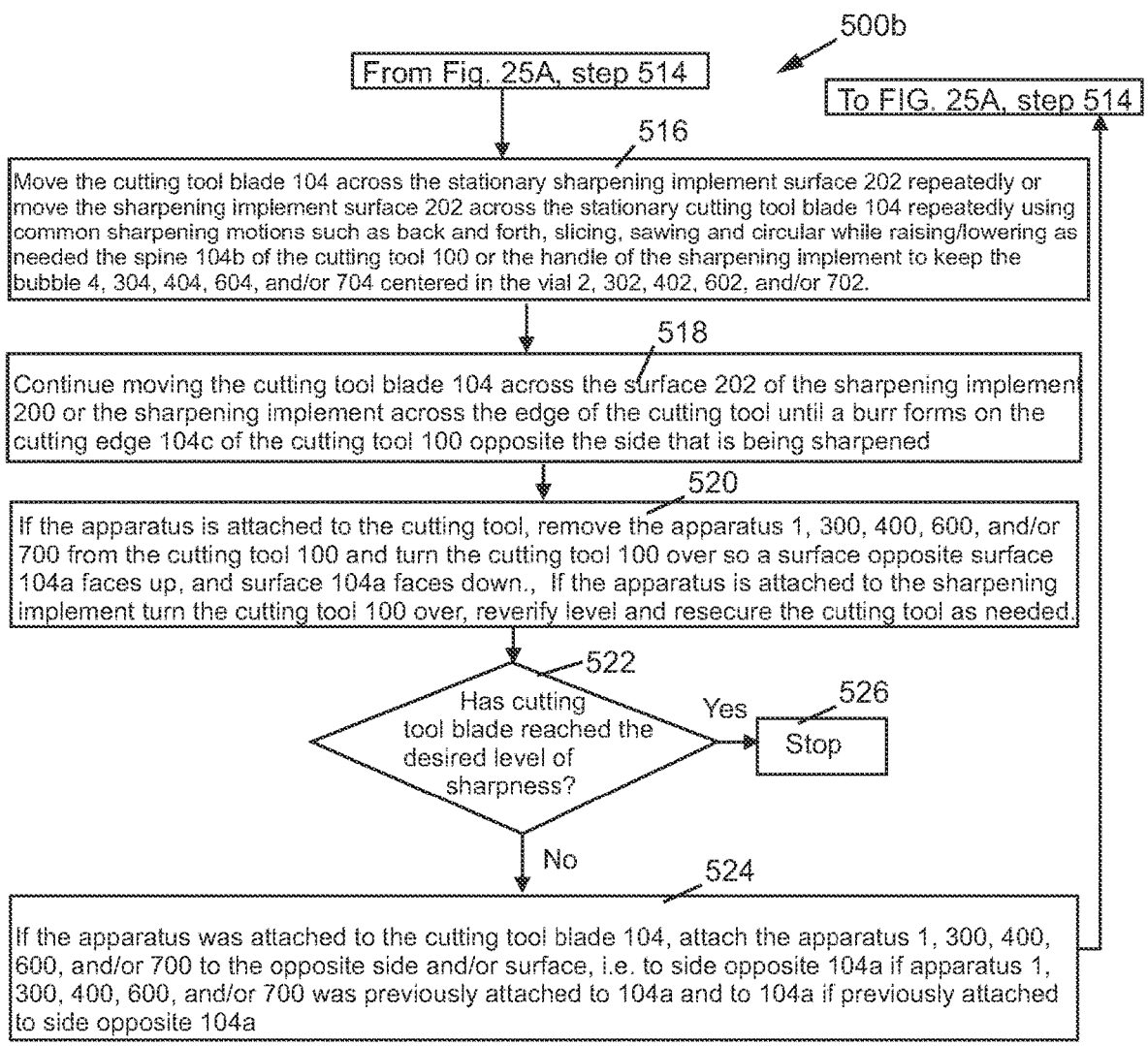
FIG. 25B is a second part of the flow chart, continuing from FIG. 25A.

FIG. 25A is a first part 500*a* of a flow chart of a method in accordance with an embodiment of the present invention; and FIG. 25B is a second part 500*b* of the flow chart, continuing from FIG. 25A.

Referring to FIG. 25A, it is decided at step 502 whether the individual person will have better technique and control, holding and moving the cutting tool 100 along the stationary unpowered unguided sharpening implement 200 or holding and moving the unpowered unguided sharpening implement 200 along the stationary cutting tool 100.

At step 504, it is determined whether, a fixed angle model, such as one or more of apparatuses 1, 600 and/or 700 or an adjustable angle model, such as one or more of apparatuses 300, and/or 400, are to be used for a sharpening process.

If at step 504, a fixed angle model, such as one of apparatuses 1, 600 and/or 700 is to be used, then a particular model of apparatus 1, 600 and/or 700, with the desired sharpening angle, such as twenty (20.0) degrees, twenty-five (25.0) degrees, or thirty (30.0) degrees for angle A1, A4, and/or A5 is selected at step 506. The spirit level vial 2, 602, or 702 is then snapped into corresponding harnesses, 6 and 8, one of 606*a-c* and 608*a-c*, or 706 and 708 of the particular fixed angle model to form the particular apparatus 1, 600 and/or 700 with a particular angle A1, A4, and/or A5.

If at step 504, an adjustable model, such as one of apparatuses 300, and/or 400, is to be used, then at step 510, the angle, such as angle A2 and/or A3 of apparatuses 300 and 400, respectively, is adjusted by rotating and aligning to the corresponding index lines.

Steps 511 512, 514, 516, 518, 520, 522, 524, and 526 are next executed for any of apparatuses 1, 300, 400, 600, and/or 700.

At step 511, turn apparatus 1, 300, 400, 600, or 700 over and stand on the article which will remain stationary—either surface 202 of the sharpening implement 200 or surface 104*a* of the blade 104 of the cutting tool, with integral magnet 16, 316, 416 one of 616*a-c*, or 716 side up to verify that the stationary article is level. Adjust and secure the stationary article as needed.

At step 512, one or more of the apparatuses 1, 300, 400, 600, and/or 700 are attached, by integral magnet, or integral hooks and a user provided elastic band, to the article which will be handheld and repeatedly moved by hand. If the cutting tool, attach to the side or surface 104*a* of the cutting tool 100 between the spine 104*b* and the cutting edge 104*c*, with the lower end of the spirit level vial 2, 302, 402, 602 and/or 702 facing the spine 104*b* of the cutting tool blade 104. If the sharpening implement, attach to the surface opposite and parallel to the sharpening surface with the lower end of the vial facing the handle of the sharpening implement.

At step 514, if the apparatus is attached to the cutting tool then place the blade 104 flat on the surface 202 of the whetstone 200 and raise the spine 104*b* of the cutting tool 100 upward until the bubble 4, 304, 404, 604, and/or 704 is centered in the tube or vial 2, 302, 404, 604, and/or 704 respectively, keeping the cutting edge 104*c* in contact with the surface 202 of the sharpening implement 200. The cutting tool blade is now at the desired angle relative to the sharpening implement. If the apparatus is attached to the sharpening implement, make contact between the sharpening surface and the cutting tool edge. Raise the handle of the sharpening implement until the bubble is centered in the spirit level vial. The sharpening implement is now at the desired angle relative to the cutting tool blade.

At step 516, move the cutting tool blade 104 across the stationary sharpening implement surface 202 repeatedly or move the sharpening implement surface 202 across the stationary cutting tool blade 104 repeatedly using common sharpening motions such as back and forth, slicing, sawing and circular while raising/lowering, as needed, the spine 104*b* of the cutting tool 100 or the handle of the sharpening implement, to keep the bubble 4, 304, 404, 604, and/or 704 centered in the spirit level vial 2, 302, 402, 602, and/or 702.

Next at step 518, continue moving, the cutting tool blade 104 across the surface 202 of the sharpening implement 200 or the sharpening implement across the edge of the cutting tool, until a burr forms on the cutting edge 104*c* of the cutting tool 100 opposite the side that is being sharpened.

Next at step 520, if the apparatus is attached to the cutting tool, remove the apparatus 1, 300, 400, 600, and/or 700 from the cutting tool 100 and turn the cutting tool 100 over so a surface opposite surface 104*a* faces up, and surface 104*a* faces down. If the apparatus is attached to the sharpening implement turn the cutting tool 100 over, reverify level and resecure the cutting tool as needed.

Next at step 522 it is determined by an individual person, if cutting tool blade reached the desired level of sharpness. If the answer is "Yes", then the process is stopped at step 526.

If the answer at step 522 is "No", then at step 524 if the apparatus was attached to the cutting tool blade 104, attach the apparatus 1, 300, 400, 600, and/or 700 to the opposite side and/or surface, i.e. to side opposite 104*a* if apparatus 1, 300, 400, 600, and/or 700 was previously attached to 104*a* and to 104*a* if previously attached to side opposite 104*a*, and continue process at step 514 shown in FIG. 25A.

In at least one embodiment, a spirit level vial (or equivalent type of level indicator such as a ball in tube inclinometer), may be used for any of tubes or vials 2, 302, 402, 602, and/or 702 to provide continuous visual feedback on how the user is holding a desired sharpening angle during routine maintenance sharpening of cutting tools such as knives, axes, chisels, shears, wood plane irons, etc with unpowered unguided sharpening implements such as whetstones and files so corrections in the angle can be made as needed at any point in the repetitive manual sharping motion Any of the apparatuses 100, 300, 400, 600, and/or 700 may be configured to attach to a cutting tool, such as 100, or an unpowered unguided sharpening implement—whichever will be hand held and manually moved.

In one or more embodiments, attachment to magnetic surfaces (or appropriate metal surfaces) of a cutting tool 100, may be done through an integral base magnet, such as through any of magnets 16, 316, 416, 616*a*-*c*, and/or 716. Attachment to non-magnetic surfaces may be by integral base hooks, such as 14 and 15; 314 and 315; 414 and 415; 615*a*-*c*; and/or 714*a* and 714*b*; and user provided elastic bands.

In one or more embodiments, the spirit level vial harness or harnesses, such as 6 and 8; 306 and 308; 406 and 408; 606*a* and 608*a*; 606*b* and 608*b*; and 606*c* and 608*c*; 706 and 708; are configured to permit the appropriate apparatus to stand upside down to level the article which is not being hand held and will not be manually moved.

In at least one embodiment, the harnesses, such as 6 and 8; 306 and 308; 406 and 408; 606*a* and 608*a*; 606*b* and 608*b*; and 606*c* and 608*c*; 706 and 708 are configured with side viewing windows for the leveling operation In a least one embodiment, the harnesses, are configured to permit the viewing of the full length of the spirit level vial and bubble position from the top when in use for a better indication of how the desired angle is being held.

In at least one embodiment, the harnesses such as 6 and 8; 306 and 308; 406 and 408; 606*a* and 608*a*; 606*b* and 608*b*; and 606*c* and 608*c*; 706 and 708 are configured for easy snap in and snap out of the respective spirit level vials or tubes 2, 302, 402, 602, and 702 for moving from one fixed model to another or for cleaning or replacement.

In at least one embodiment, each of the apparatuses 1, 300, 400, 600, and 700 is very small (miniature) to attach to even the smallest of common cutting tools and function properly.

In at least one embodiment each of the apparatuses 1, 300, 400, 600, and 700 is lightweight with a low center of gravity to be stable when attached to the article which will be hand held and in motion In one or more embodiments, "slow" spirit level vials are used, for one of tubes or vials 2, 302, 402, 602, and/or 702—one with a relatively small diameter and/or filled with a liquid that is slightly more viscous that typical to make the indicating bubble less sensitive to the acceleration and deceleration of the manual sharpening motions In at least one embodiment in a method of using one or more of apparatuses 1, 300, 400, 600, and/or 700, a fixed model is typically selected with the desired sharpening angle and snapped in the spirit level vial or tube or the adjustable model is set to the desired sharpening angle. Then the appropriate apparatus of apparatuses 1, 300, 400, 600, and/or 700 is turned over and stands on the article which will remain stationary to verify that it is level. Then adjustment occurs as needed. The apparatus of one or more apparatuses 1, 300, 400, 600 and/or 700 is then attached to the article to be handheld and manually moved.

The "triad" fixed apparatus 600 has three sets of harnesses (606*a* and 608*a*; 606*b* and 608*b*; and 606*c* and 608*c*) in a single apparatus permitting three fixed sharpening angles in a single apparatus.

The two adjustable models or apparatuses 300 and 400, have a "split index" or one set of values printed or otherwise fixed on one side of the apparatus (i.e. "20" and "15 degrees on one side of member 310; and "25" and "30" degrees on the other side of member 310 for apparatus 300; and "30", "20", and "10" degrees on member 409*a* and "15", "25", and "35" degrees on member 409*b* on the other side of the apparatus. This increases the spacing between the index lines improving the visibility of the set points and minor angle adjustments within the small apparatus The adjustable model with the worm/worm gear mechanism, apparatus 400, permits very fine adjustments of the sharpening angle and securely holds the angle without any need to reclamp the rotating member.

In at least one embodiment, the apparatus 700 has a separately molded base 712 which is connected to triangular member 710 with a temporary pivot action which is then fixed in place with adhesive during manufacturing thereby permitting fixed models set at any common sharpening angle with the single apparatus.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a cutting tool sharpening angle aid comprised of:
   a spirit level vial;
   a first spirit level vial harness to which the spirit level vial is configured to be removably attached;
   a first member to which the first spirit level harness is attached;
   and
   a first attachment device which is configured to removably attach the first member to a blade of a cutting tool.

2. The apparatus of claim 1 wherein
   the first attachment device is a magnet.

3. The apparatus of claim 1 wherein
   the first attachment device is an elastic band.

4. The apparatus of claim 2 wherein
   the cutting tool sharpening angle aid is further comprised of a second attachment device which is configured to removably attach the first member to the blade of the cutting tool; and
   wherein the second attachment device is an elastic band.

5. The apparatus of claim 1 wherein
   the first member is triangular shaped.

6. The apparatus of claim 1 wherein
   the cutting tool sharpening angle aid is further comprised of a base;
   wherein the base is rotatably attached to the first member; and wherein the first attachment device is configured to removably attach the first member to the blade of the cutting tool through the base.

7. The apparatus of claim 6 further comprising:
a second member which protrudes out from the base; and
wherein the base is rotatably attached to the first member through the second member;
and wherein the first attachment device is configured to removably attach the first member to the blade of the cutting tool through the base and the second member.

8. The apparatus of claim 7 further comprising:
a thumbscrew; and
wherein there are mating threads cut in the top of the second member; and
wherein the thumbscrew and the mating threads form a worm and a worm gear mechanism configured to adjust and secure an angle of the spirit level vial relative to the base; and
wherein the thumbscrew is configured to rotate the first member with respect to the base by turning the thumbscrew.

9. The apparatus of claim 1 further comprising:
a second spirit level vial harness to which the spirit level vial is configured to be removably attached;
wherein the first member is attached to the second spirit level vial harness;
wherein the spirit level vial has a first end and a second end; and
wherein the first end of the spirit level vial is configured to be removably attached to the first spirit level harness while the second end of the spirit level harness is removably attached to the second spirit level harness, to thereby temporarily fix the spirit level vial at a first orientation with respect to the first member.

10. The apparatus of claim 9 further comprising:
a third spirit level vial harness to which the spirit level vial is configured to be removably attached;
a fourth spirit level vial harness to which the spirit level vial is configured to be removably attached;
a fifth spirit level vial harness to which the spirit level vial is configured to be removably attached; and
a sixth spirit level vial harness to which the spirit level vial is configured to be removably attached;
wherein the first end of the spirit level vial is configured to be removably attached to the third spirit level harness while the second end of the spirit level harness is attached to the fourth spirit level harness, to thereby temporarily fix the spirit level vial at a second orientation, which is different from the first orientation, with respect to the first member; and
wherein the first end of the spirit level vial is configured to be removably attached to the fifth spirit level harness while the second end of the spirit level harness is attached to the sixth spirit level harness, to thereby temporarily fix the spirit level vial at a third orientation, which is different from the first and second orientations, with respect to the first member.

11. A method comprising the steps of:
placing a cutting tool sharpening aid on a cutting tool;
wherein the cutting tool sharpening aid is comprised of:
a spirit level vial;
a first spirit level vial harness to which the spirit level vial is configured to be removably attached;
a first member to which the spirit level harness is attached; and
a first attachment device which is configured to removably attach the first member base to a blade of the cutting tool.

12. The method of claim 11 wherein
the first attachment device is a magnet.

13. The method of claim 11 wherein
the first attachment device is an elastic band.

14. The method of claim 12 wherein
the cutting tool sharpening angle aid is further comprised of a second attachment device which is configured to attach the first member to the blade of the cutting tool; and
wherein the second attachment device is an elastic band.

15. The method of claim 11 wherein
the first member is triangular shaped.

16. The method of claim 11 wherein
the cutting tool sharpening angle aid is further comprised of a base;
wherein the base is rotatably attached to the first member; and
wherein the first attachment device is configured to removably attach the first member to the blade of the cutting tool through the base.

17. The method of claim 16 wherein
a second member protrudes out from the base;
wherein the base is rotatably attached to the first member through the second member;
and wherein the first attachment device is configured to removably attach the first member to the blade of the cutting tool through the base and the second member.

18. The method of claim 17 wherein
the cutting tool sharpening angle aid is further comprised of a thumbscrew; and
wherein there are mating threads cut in the top of the second member;
wherein the thumbscrew and the mating threads form a worm and a worm gear mechanism configured to adjust and secure an angle of the spirit level vial relative to the base; and
wherein the thumbscrew is configured to rotate the first member with respect to the base by turning the thumbscrew.

19. The method of claim 11 wherein
the cutting tool sharpening aid is further comprised of a second spirit level vial harness to which the spirit level vial is configured to be removably attached; and
wherein the spirit level vial has a first end and a second end; and
wherein the first end of the spirit level vial is configured to be removably attached to the first spirit level harness while the second end of the spirit level harness is removably attached to the second spirit level harness, to thereby temporarily fix the spirit level vial at a first orientation with respect to the first member.

20. The method of claim 19 wherein the cutting tool sharpening aid is further comprised of:
a third spirit level vial harness to which the spirit level vial is configured to be removably attached;
a fourth spirit level vial harness to which the spirit level vial is configured to be removably attached;
a fifth spirit level vial harness to which the spirit level vial is configured to be removably attached; and
a sixth spirit level vial harness to which the spirit level vial is configured to be removably attached;
wherein the first end of the spirit level vial is configured to be removably attached to the third spirit level harness while the second end of the spirit level harness is attached to the fourth spirit level harness, to thereby temporarily fix the spirit level vial at a second orientation, which is different from the first orientation, with respect to the first member; and wherein the first end of the spirit level vial is configured to be removably attached to the fifth spirit level harness while the second end of the spirit level harness is attached to the sixth spirit level harness, to thereby temporarily fix the spirit level vial at a third orientation, which is different from the first and second orientations, with respect to the first member.

21. The apparatus of claim 9 wherein the cutting tool sharpening angle aid is further comprised of:
a third spirit level vial harness to which the spirit level vial is configured to be removably attached; and
a fourth spirit level harness to which the spirit level vial is configured to be removably attached;
wherein the third and the fourth spirit level vial harnesses are attached to the first member;
wherein the spirit level vial is configured to be simultaneously removably attached to the first and the second spirit level harnesses to orient the spirit level vial in a first orientation with respect to a first member;
wherein the spirit level vial is configured to be simultaneously removably attached to the third and the fourth spirit level harnesses to orient the spirit level vial in a second orientation with respect to a first member, wherein the second orientation is different from the first orientation;
wherein the first attachment device is fixed to the first member at a first location of the first member; and
further comprising a second attachment device fixed to the first member at a second location of the first member, which is different from the first location; and
wherein when the spirit level vial is simultaneously attached to the first and the second spirit level harnesses, and the first attachment device removably attaches the first member to a blade of a cutting tool, the blade must be held at a first angle, with respect to a level surface, in order for the spirit level vial to indicate a level state; and
wherein when the spirit level vial is simultaneously attached to the third and the fourth spirit level harness, and the second attachment device removably attaches the first member to the blade, the blade must be held at a second angle, with respect to the level surface, wherein the second angle is different from the first angle, in order for the spirit level vial to indicate a level state.

22. The apparatus of claim 21 further comprising
a fifth spirit level vial harness to which the spirit level vial is configured to be removably attached; and
a sixth spirit level harness to which the spirit level vial is configured to be removably attached;
wherein the fifth and sixth spirit level harnesses are attached to the first member;
wherein the spirit level vial is configured to be simultaneously removably attached to the fifth and the sixth spirit level harnesses to orient the spirit level vial in a third orientation with respect to the first member; and further comprising
a third attachment device fixed to the first member at a third location of the first member, which is different from the first and the second locations; and
wherein when the spirit level vial is simultaneously attached to the fifth and the sixth spirit level harnesses, and the third attachment device removably attaches the first member to the blade of the cutting tool, the blade must be held at a third angle, with respect to the level surface, wherein the third angle is different from the first and the second angle, in order for the spirit level vial to indicate a level state.

23. The apparatus of claim 21 wherein
the spirit level vial is configured to snap in and snap out of the first, second, third, and fourth level harnesses.

24. The apparatus of claim 22 wherein
the spirit level vial is configured to snap in and snap out of the first, second, third, fourth, fifth and sixth level harnesses.

25. The apparatus of claim 1 wherein
the first member has a first side with a first plurality of numbers located on the first side;
the first member has a second side, which opposes the first side of the first member, with a second plurality of numbers located on the second side; and
wherein each of the first plurality of numbers is different from each of the second plurality of numbers.

26. An apparatus comprising:
a cutting tool sharpening angle aid comprised of:
a first spirit level vial harness to which a spirit level vial is configured to be attached;
a second spirit level harness to which a spirit level vial is configured to be attached;
a first member to which the first and second spirit level harnesses are attached;
a first attachment device fixed to the first member at a first location of the first member, such that the first attachment device is configured to removably attach the first member to a blade of a cutting tool; and
a second attachment device fixed to the first member at a second location of the first member, such that the second attachment device is configured to removably attach the first member to the blade of the cutting tool;
wherein when a spirit level vial is attached to the first spirit level harness, and the first attachment device removably attaches the first member to the blade, the blade must be held at a first angle, with respect to a level surface, in order for the spirit level vial attached to the first spirit level harness to indicate a level state; and
wherein when a spirit level vial is attached to the second spirit level harness, and the second attachment device removably attaches the first member to the blade, the blade must be held at a second angle, with respect to the level surface, wherein the second angle is different from the first angle, in order for the spirit level vial attached to the second spirit level harness to indicate a level state.

27. The apparatus of claim 26 further comprising:
a third spirit level vial harness to which a spirit level vial is configured to be attached;
a third attachment device fixed to the first member at a third location of the first member, such that the third attachment device is configured to removably attach the first member to the blade of the cutting tool; and
wherein when a spirit level vial is attached to the third spirit level harness, and the third attachment device removably attaches the first member to the blade, the blade must be held at a third angle, with respect to the level surface, wherein the third angle is different from the first and the second angle, in order for the spirit level vial attached to the third spirit level harness to indicate a level state.

28. The apparatus of claim 26 wherein
a first number designation is provided on the first member at a first orientation with respect to the first member;
wherein a second number designation is provided on the first member at a second orientation with respect to the first member, which is different from the first orientation;
wherein the first number designation is configured to be in an upright readable state, while the second number designation is not in an upright readable state, when a spirit level vial is attached to the first spirit level harness, the first attachment device removably attaches the first member to the blade, and the blade is at an angle of the first number designation degrees with respect to a level surface; and
wherein the second number designation is configured to be in an upright readable state, while the first number designation is not in an upright readable state, when a spirit level vial is attached to the second spirit level harness, the second attachment device removably attaches the first member to the blade, and the blade is at an angle of the second number designation degrees with respect to the level surface.

29. The apparatus of claim 26 wherein
a first number designation is provided on the first member at a first orientation with respect to the first member;
wherein a second number designation is provided on the first member at a second orientation with respect to the first member, which is different from the first orientation;
wherein a third number designation is provided on the first member at a third orientation with respect to the first member, which is different from the first and the second orientations;
wherein the first number designation is configured to be in an upright readable state, while the second and the third number designations are not in an upright readable state, when a spirit level vial is attached to the first spirit level harness, the first attachment device removably attaches the first member to the blade, and the blade is at an angle of the first number designation degrees with respect to a level surface;
wherein the second number designation is configured to be in an upright readable state, while the first and the third number designations are not in an upright readable state, when a spirit level vial is attached to the second spirit level harness, the second attachment device removably attaches the first member to the blade, and the blade is at an angle of the second number designation degrees with respect to the level surface; and
wherein the third number designation is configured to be in an upright readable state, while the first and the second number designations are not in an upright readable state, when a spirit level vial is attached to the third spirit level harness, the third attachment device removably attaches the first member to the blade, and the blade is at an angle of the third number designation degrees with respect to the level surface.

* * * * *